(12) United States Patent
Katzenelson et al.

(10) Patent No.: US 11,537,844 B2
(45) Date of Patent: Dec. 27, 2022

(54) SYSTEMS AND METHODS OF BUSINESS CATEGORIZATION AND SERVICE RECOMMENDATION

(71) Applicant: Intuit Inc., Mountain View, CA (US)

(72) Inventors: Erez Katzenelson, Tel Aviv (IL); Elik Sror, Tel Aviv (IL); Shlomi Medalion, Tel Aviv (IL); Shimon Shahar, Hod HaSharon (IL); Shir Meir Lador, Tel Aviv (IL); Sigalit Bechler, Tel Aviv (IL); Alexander Zhicharevich, Tel Aviv (IL); Onn Bar, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 430 days.

(21) Appl. No.: 16/779,785

(22) Filed: Feb. 3, 2020

(65) Prior Publication Data

US 2021/0241072 A1 Aug. 5, 2021

(51) Int. Cl.
| | |
|---|---|
| *G06N 3/04* | (2006.01) |
| *G06F 16/9535* | (2019.01) |
| *G06N 3/08* | (2006.01) |
| *G06Q 30/04* | (2012.01) |
| *G06Q 40/00* | (2012.01) |

(52) U.S. Cl.
CPC ....... *G06N 3/0427* (2013.01); *G06F 16/9535* (2019.01); *G06N 3/0445* (2013.01); *G06N 3/0454* (2013.01); *G06N 3/08* (2013.01); *G06Q 30/04* (2013.01); *G06Q 40/12* (2013.12)

(58) Field of Classification Search
CPC .... G06N 3/0427; G06N 3/0454; G06N 3/084; G06N 3/08; G06N 3/0445; G06N 3/0481; G06N 20/00; G06Q 30/04; G06Q 40/12; G06F 16/9535
See application file for complete search history.

(56) References Cited

U.S. PATENT DOCUMENTS

| | | | |
|---|---|---|---|
| 10,699,112 B1 * | 6/2020 | Corcoran | G06V 30/416 |
| 2011/0087678 A1 * | 4/2011 | Frieden | G06F 16/9535 |
| | | | 707/E17.059 |
| 2013/0030913 A1 * | 1/2013 | Zhu | G06Q 30/0241 |
| | | | 705/14.52 |
| 2014/0195391 A1 * | 7/2014 | Okabayashi | G06Q 40/12 |
| | | | 705/30 |
| 2017/0031996 A1 * | 2/2017 | Priness | G06F 16/24575 |
| 2022/0027477 A1 * | 1/2022 | Hercock | G06N 3/0445 |

* cited by examiner

*Primary Examiner* — Etienne P Leroux
(74) *Attorney, Agent, or Firm* — DLA Piper LLP (US)

(57) ABSTRACT

A method for recommending offerings to a business may include: receiving a request for recommended business offerings from a device; receiving business data associated with a business from the device, the business data comprising invoice data associated with the business; embedding the business data to a vector space to obtain a business vector, the vector space comprising a plurality of other vectors associated with other businesses; calculating a relation metric between the business vector and a vector of the plurality of other vectors, the vector being associated with a second business, the relation metric representing a degree of relation between the business and the second business; determining that the relation metric is above a pre-defined threshold value; and responsive to the determining, sending business data associated with the second business to the device, the business data associated with the second business comprising invoice data associated with the second business.

20 Claims, 17 Drawing Sheets

SYSTEMS AND METHODS OF BUSINESS CATEGORIZATION AND SERVICE RECOMMENDATION

BACKGROUND OF THE DISCLOSURE

There are many different applications, such as accounting software or other business management software, that have a large user base of businesses and thus large databases of business information. It is relatively common for these databases to not contain enough information about each business to allow significant or effective analysis of the database and the businesses within them. They may have lacking, incorrect, or misleading knowledge on the industry, category, or services/products offered by the business, and it is also not uncommon for the data that is stored in relation to a business to not be in a structured or useful format.

Many businesses do not select a category and/or description for their business when registering to use software or participate in an organization. A selected category can be helpful, but categories by themselves are quite broad and cannot offer extensive insight due to the extensive variety in business operations. Typically, a database will offer a small number of possible categories, e.g. sixteen categories. Examples of categories may be "Educational Services", "Wholesale Trade", "Finance and Insurance", "Manufacturing", "Healthcare and Social Assistance", and the like. In addition, databases also contain a description for each business, which is similarly left blank much of the time. But even when a description is provided, the allowance of free-form text can give rise to much inconsistency. For example, three different businesses within a database may have descriptions of "cleaning and maintenance", "janitorial services", and "cleaning, maintenance, and janitorial services." Common sense may suggest that these businesses are incredibly similar, but within a database, these are considered different descriptions and add unnecessary inconsistency.

In addition, it is difficult to summarize the services or products offered by a business, despite databases typically having access to the business's invoices and bank transactions. Obtaining accurate and appropriate lists of business offerings (e.g., services and/or products) requires manual entry or adherence to a pre-defined list when selecting offerings.

Due to these issues, it is often difficult to truly understand the nature of businesses and their operations within a database or in a software environment. This lack of understanding can limit the ability to identify fraud among businesses, understand which areas of industry are more susceptible to fraud, and what kind of services are more susceptible to fraud. It can also limit the ability to suggest new products or services to businesses or provide warnings based on mistakes from similar businesses in the past.

DETAILED DESCRIPTION OF SEVERAL EMBODIMENTS

Figure 1:
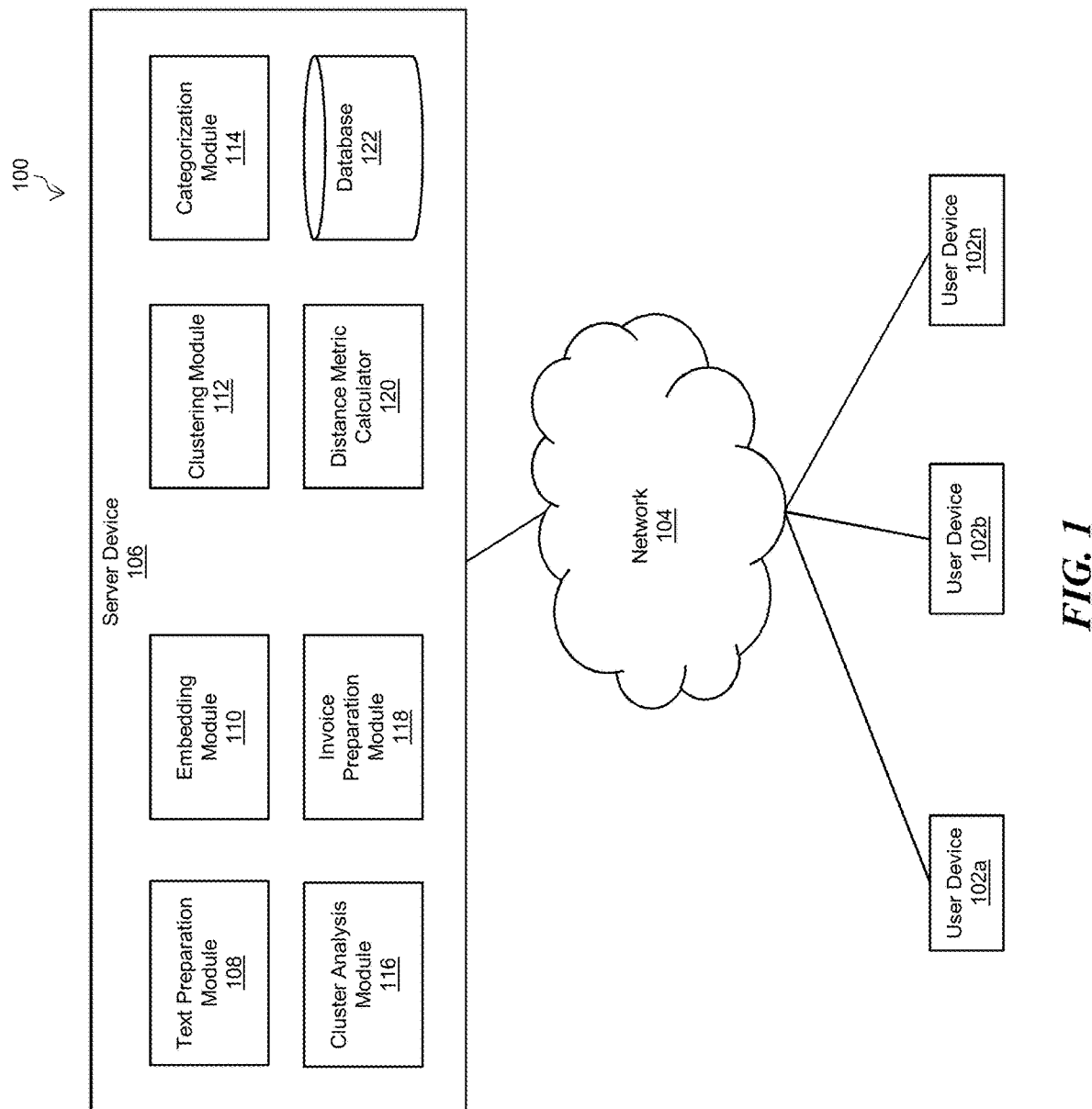
FIG. 1 is a block diagram of an example system for business categorization and service recommendation, according to an embodiment of the present disclosure.

Embodiments of the present disclosure relate to various systems and methods for business categorization and service recommendation based on invoices and descriptions. In some embodiments of the present disclosure, a method may be used to predict a business's category (e.g., classify or categorize a business) based on a given business description. For example, in some types of accounting software, only a portion of the users (e.g., businesses) supply both a category (e.g., one of sixteen possible categories) and a description (e.g., a semi free-form description with thousands of possibilities). Many users supply only one of the two, and some users don't supply either. A method may be used to train a neural network architecture via supervised learning (e.g., mapping an input to an output based on example input-output pairs provided to the network) to predict missing categories for businesses based on their given description. The network may be trained on existing businesses that have provided both descriptions and categories. Another method of the present disclosure may use this trained neural network to classify new businesses or users upon signing up for software services, store the classifications within a database, and/or display the classification to the new business or user for confirmation. For example, a new business, when registering with an accounting software, may provide a description, "cleaning, maintenance, and janitorial services." The method may categorize this business as "administrative and support and waste management and remediation services."

According to another embodiment of the present disclosure, a method may be used to standardize and provide consistency across a database of business descriptions. As mentioned earlier, databases for different types of accounting software include business descriptions for each of their users, but allowing free-form text for these descriptions prevents consistency. A method of the present disclosure may use clustering techniques and language processing techniques to cluster or group business descriptions together that are similar, and generate a representative description for each cluster. In general, a cluster may be a group of vectors or points within a certain pre-defined distance or radius. This description may then be associated with the businesses within that cluster, allowing for greater consistency and ease of identification of similar businesses within a software environment. This may be referred to as "reducing the description space" and may reduce repetitive and similar descriptions with slight variations in wording or lexicography that can clutter a database. For example, the method may determine that "cleaning and maintenance," "janitorial services," and "cleaning, maintenance, and janitorial services" are part of the same cluster and generate a cluster description of "cleaning, maintenance, and janitorial services" that represents all three. A description that "represents" the businesses within a cluster may accurately describe each business by using the most common words that appear in all of the descriptions within a cluster. Additional details on descriptions that represent a cluster and generating this type of description may be discussed in relation to FIG. 6.

According to another embodiment of the present disclosure, a method may be used to predict a business's category (e.g., classify/categorize a business) based on analyzing the contents of the business's invoices. For example, as previously discussed, in some types of accounting software, only a portion of the user base may have supplied a category of their business. However, these types of software may have access to the business's invoices, as that is what the software may be used to maintain and analyze. A method may train a neural network architecture via supervised learning to predict categories for businesses based on the contents of their invoices. Contents of their invoices may include line items or invoice lines (e.g., numbered transactions and corresponding descriptions such as products and/or services, prices, locations, customers, etc.) and other related information, such as bank transactions. Another method may use this neural network to classify uncategorized businesses within an accounting software database. For example, the method may analyze the contents of a business's invoice, identify line items (e.g., "back surgery; $5,000;" "hydrocodone; $4,000;" and "dialysis; $500;"), and classify the business as "health care and social assistance."

According to another embodiment of the present disclosure, a method may be used to generate a list of products and/or services offered by a business by analyzing the business's invoices. For example, many businesses may have quite extensive and detailed offerings, including numerous variations of certain products or services. It can be difficult to account for all of these based on pre-defined options provided by an accounting software. In addition, manually going through invoices to count and list all products and services for an entire user base is not viable either. Therefore, a method may be used to analyze the invoices of a user base, extract offerings (e.g., products and services), cluster the offerings, and generate a representative offering description for each cluster, allowing for a more standardized and comprehensive database of product and service offerings among a user base. The method may analyze the invoices of a business, identify the associated clusters, and generate a bounded list of offerings for that business. For example, a pre-defined list of services that a dry cleaning business may select from within an accounting software may include "dry cleaning" and "laundry." The method of the present disclosure may analyze the dry cleaning business's invoices and identify associated clusters (e.g. formed by analyzing other dry cleaning services' invoices) with more specialized descriptions such as "formal wear cleaning," "rug cleaning," and "suede cleaning."

According to another embodiment of the present disclosure, a method may be used to train a neural network architecture to predict whether an invoice and a description associated with a business are related. For example, the neural network may predict that an invoice with text "concrete mix; 400 feet; $15/ft" and a business description "construction services" may be related, while predicting that an invoice with text "makeup with lashes; $25" would be unrelated to a business description "education services." In another embodiment, this trained neural network architecture may be used to recommend services or product offerings to a new business. For example, when a new business registers with an accounting software, the user associated with the business may provide a business description, "motorcycle repair." The method may determine that related businesses are successfully repairing mopeds, and recommend to the new business a moped repair service offering.

The embodiments listed above and described herein may improve the technical functioning of computer data storage systems. For example, as described above, some embodiments may reduce the amount of data required to be stored by consolidating portions of the data having similar meanings. Some embodiments may also improve data storage system functionality by improving data search speed and accuracy due to improved classification of data within the storage system.

FIG. 1 is a block diagram of an example system 100 for aggregating a database of businesses, according to an embodiment of the present disclosure. System 100 may include a plurality of user devices 102a, 102b, . . . , 102n (102 generally) and a server device 106, all of which may be communicably coupled via network 104. In some embodiments, system 100 may include any number of user devices. For example, for an organization that manages an accounting software and associated database, there may be an extensive user base with thousands or even millions of users that may connect via user devices. Server device 106 may be configured to selectively send a variety of information, such as product or service recommendations or business categorizations, to multiple or single user devices.

A user device 102 can include one or more computing devices capable of receiving user input as well as transmitting and/or receiving data via network 104 or communicating with server device 106. In some embodiments, a user device 102 can include a conventional computer system, such as a desktop or laptop computer. Alternatively, a user device 102 may include a device having computer functionality, such as a personal digital assistant (PDA), a mobile telephone, a smartphone, or other suitable device. In some embodiments, a user device 102 may be the same as or similar to user device 1700 described below in the context of FIG. 17.

Network 104 may include one or more wide areas networks (WANs), metropolitan area networks (MANs), local area networks (LANs), personal area networks (PANs), or any combination of these networks. Network 106 may include a combination of one or more types of networks, such as Internet, intranet, Ethernet, twisted-pair, coaxial cable, fiber optic, cellular, satellite, IEEE 801.11, terrestrial, and/or other types of wired or wireless networks. Network 104 can also use standard communication technologies and/or protocols.

As shown in FIG. 1, server device 106 may include text preparation module 108, embedding module 110, clustering module 112, categorization module 114, cluster analysis module 116, invoice preparation module 118, relation metric calculator 120, and a database 122. Server device 106 may be configured to receive business descriptions, invoices, category selections, and bank transactions from user devices 102. In some embodiments, server device 106 may be configured to obtain bank transactions for users by contacting a financial services network (not shown). For example, a user may grant permission to server device 106 to utilize login credentials for a bank to monitor a bank account associated with a business. In some embodiments, server device 106 may be configured to extract information for bank transactions including, but not limited to, recipient, date, location, amount, etc. In some embodiments, server device 106 may be configured to store bank transaction information, invoices, business descriptions, category selections, and any other relevant information related to each business and/or user in database 122.

Text preparation module 108 may be configured to clean up business descriptions or invoice text. In some embodiments, text preparation module 108 may be configured to perform a process similar to or the same as process 300 of FIG. 3 to clean up a description. Text preparation module 108 may be configured to remove stop words, perform lemmatization processes, and calculate term frequency-inverse document frequency values. Additional details of these steps are discussed in relation to FIG. 3.

Embedding module 110 may be configured to embed text to vector form within a continuous vector space. In some embodiments, embedding module 110 may convert text into a vector within a continuous vector space. In some embodiments, a word2vec model may be used to embed text to the vector space. The word2vec model may be pre-trained. In some embodiments, each description may be converted to a three hundred dimensional vector. The word2vec model may use a continuous bag-of-words approach (CBOW). The word2vec model may be configured to create a "bag-of-words" for each description. A bag-of-words for a description may be a set (e.g. JSON object) that includes every word in the description and the multiplicity (e.g., the number of times the word appears in the description) of each word. The word2vec model may be configured to predict a vector representation of each word using the context of the word's usage in the description. For example, the word2vec model may consider the surrounding words and the multiplicities, but may not use grammar or the order of the words in the description. Embedding module 110 may be configured to compile the vector representations of each word in a description to create a three hundred dimensional vector representing the description. In some embodiments, this may include averaging the vectors of every word in the description to generate a representative vector. In some embodiments, this may include generating a matrix, where each column is a vector corresponding to a word in the description. The dimension of the vector may be any number (e.g., fifty, two hundred, or five hundred). In some embodiments, embedding module 110 may be tunable. The parameters used to create vector representations may be variable and may be adjusted or tuned based on learning. In some embodiments, embedding module 110 may include an encoder and/or a neural network architecture to perform the embedding processes.

In some embodiments, embedding module 110 may use a word2vec model with a skip-gram approach, where a skip-gram approach predicts a focus word within a phrase or sentence. The pre-trained word vectors may be initially trained on a variety of sources, such as Google News and Wikipedia. In some embodiments, embedding module 110 may employ other words embedding frameworks such as GloVe (Global Vector) or FastText. GloVe techniques may, rather than predicting neighboring words (CBOW) or predicting the focus word (skip-gram) may embed words such that the dot product of two word vectors is close to or equal to the log of the number of times appear near each other. In some embodiments, for each term or word in a sentence or phrase (e.g. a line item of an invoice), embedding module 110 may attach the relevant word-vector, meaning a phrase may initially consist of a sequence of word-vectors.

Clustering module 112 may be configured to generate clusters of vectors within a vector space. In some embodiments, clustering module 112 may generate clusters of invoice vectors or business/business description vectors. In some embodiments, clustering module 112 may apply a mean-shift clustering algorithm to cluster the business description vectors. Mean-shift clustering algorithms may place a weighing function/kernel at each point in the vector space, where each weighing function/kernel has an associated bandwidth parameter. Adding up every kernel may generate a probability surface. The mean-shift algorithm may iteratively shift each kernel to a higher density region in the vector space until it achieves convergence. When convergence is reached, which depends on the bandwidth (the bandwidth reflects the "width" or "scope" of the cluster), all points or vectors that reside within the cluster are then associated with that cluster. Any number of clusters may be generated in the vector space. Because the clustering module 112 is generating clusters of vectors that have been mapped from business descriptions, it can recognize that similar vectors (and thus similar descriptions) should be in the same cluster. In some embodiments, clustering module 112 may use hierarchical clustering analysis to generate a hierarchy of clusters.

In some embodiments, clustering module 112 may be configured a variety of clustering techniques, such as k-means, affinity propagation, spectral clustering, hierarchical clustering, density-based spatial cluster of applications with noise (DBSCAN), OPTICS, Gaussian mixture modeling, or Birch. For example, k-means clustering techniques may separate samples into a pre-defined number of groups of equal variance. For a k-means algorithm, the centroids of each cluster (e.g. the central point of each business category in the vector space) is chosen ahead of time. The algorithm may assign each sample (e.g. each business vector or invoice vector) to its nearest centroid, create new centroids/categories by taking the mean value of all the samples, and compute the differences between the old and new centroids. The algorithm may repeat these steps until the difference value is below a certain threshold.

Categorization module 114 may be configured to determine a category using a trained supervised learning model. In some embodiments, categorization module 114 may include a neural network architecture trained to predict business categories or descriptions. In some embodiments, categorization module 114 may be trained to predict categories based on descriptions or predict categories based on invoices. Cluster analysis module 116 may be configured to analyze a cluster (e.g. a cluster generated by clustering module 112) and generate a description of text representing the cluster. In some embodiments, this description may be in natural language or normal text, and not in vector format. In some embodiments, generating a description that represents each cluster may include combining up to three original descriptions (prior to any processing) that contain a certain, pre-defined amount of the words with the highest TFIDF values, such as those calculated by text preparation module 108. For example, cluster analysis module 116 may, based on the vectors within a generated cluster, obtain the textual business descriptions associated with each vector. Cluster analysis modules 116 may determine up to three descriptions that contain 95% of the words with the five highest TFIDF values. In some embodiments, the percentage and the number of highest TFIDF values may be adjusted according to how narrow/broad and long/short the cluster descriptions are desired to be. In some embodiments, cluster analysis module 116 may combine fewer or more than three descriptions to generate the representative description. The phrase or group of text resulting from the combined descriptions may be used as a description for the associated cluster. The representative description may also be assigned to every business with an associated description vector within the cluster. In some embodiments, the representative description may replace the user provided description associated with each business in the database 122. In some embodiments, cluster analysis module 116 may be configured to determine and assign one or more clusters to an invoice vector and compile all associated cluster descriptions into a list.

Invoice preparation module 118 may be configured to extract text from invoices. In some embodiments, invoice preparation module 118 may be configured to use optical character recognition (OCR) to extract text from invoice files (e.g. PDF, Word Documents, etc.) or images (e.g. PNG, JPEG, etc.). Invoice files or images may be stored in database 122. In some embodiments, invoice preparation module 118 may be configured to generate a representative vector of an invoice based on a plurality of vectors describing line items of the invoice. For example, generating a representative vector for Business A may include analysis and processing of the plurality of vectors for each line item of each invoice of Business A. Invoice preparation module 118 may combine words (in vector format or in the vector space) within each line item using a long short-term memory (LSTM) layer. In some embodiments, this may reduce redundancy and improve efficiency and accuracy of downstream processing. Invoice preparation module 118 may also utilize a convolutional neural network to combine line item vectors (or invoice line vectors) within the same invoice to create a vector representing that invoice. In some embodiments, the convolutional neural network may be configured to add or subtract the plurality of line item vectors with various weights to create a single vector representing the invoice. Invoice preparation module 118 may then combine all invoice vectors associated with Business A to generate a vector representing Business A. In some embodiments, this may include averaging every invoice vector associated with Business A.

An LSTM layer is a type of recurrent neural network (RNN) that, given a set of input vectors, produces an output vector. The output vector may contain the data encoded from the received input vectors and may be a different dimension than the input vectors. In some embodiments, the RNN may be trained to determine the LSTM weights such that they learn to capture the most relevant aspects of the sequence of vectors in the output vector (e.g. to predict the correct category of a business). In some embodiments, for each term/word in a sentence describing a line-item, a word-vector may be given as input to an LSTM layer. In other words, the LSTM layer may receive a sequence of word-vectors. The LSTM layer may generate a single vector representing the full sentence or line-item. In some embodiments, the LSTM layer may employ vector addition, vector subtraction, vector multiplication, scalar multiplication, sigmoid function multiplication, hyperbolic function multiplication (e.g. tan h, sin h, cos h, etc.), and various other pointwise vector operations to combine the word vectors into a single vector representing the lines. In some embodiments, the RNN may be trained to optimize the parameters (e.g. the RNN may learn the parameters) of the sigmoid functions and hyperbolic functions.

In some embodiments, other techniques may be used to receive vectors representing the words in a line-item, such as transformer methods of Bert, XLNet, GP2, etc. Many of these methods may provide a vector representing each word in the line-item, but also a vector representing the whole line-item (e.g. the CLS token vector in Bert). In some embodiments, the line-item may be an input to one of the transformer methods, and the output vector representing the line-item may be used for additional analysis.

Relation metric calculator 120 may be configured to calculate a relation metric between two vectors. In some embodiments, relation metric calculator 120 may be configured to calculate a relation metric between a business vector and an invoice vector. A relation metric may represent a degree of relation between the vectors and thus the corresponding businesses. A low relation metric may correspond to a low relation between two vectors. For example, a relation metric calculated between a business vector for a tax service business and an invoice vector for a pool cleaning service may be low or near-zero. A relation metric calculated between a business vector for a Jacuzzi supplier and an invoice for a pool supplier may be higher, due to the improved commonalities between businesses and invoices. A relation metric calculated between a business vector for a car repair service and an invoice vector for an auto body shop may be higher than the previous two examples. In some embodiments, the relation metrics may be used to train a neural network to predict related/unrelated pairs of invoices and business descriptions. In some embodiments, the relation metric may be an inner product between the two vectors. In some embodiments, relation metric calculator 120 may be configured to apply a sigmoid function to confine the relation metric between zero and one. In some embodiments, relation metric calculator 120 may be configured to determine services related to a business, such as described in relation to FIG. 15.

The various system components—such as modules 108 through 122—may be implemented using hardware and/or software configured to perform and execute the processes, steps, or other functionality in conjunction therewith.

Figure 2:
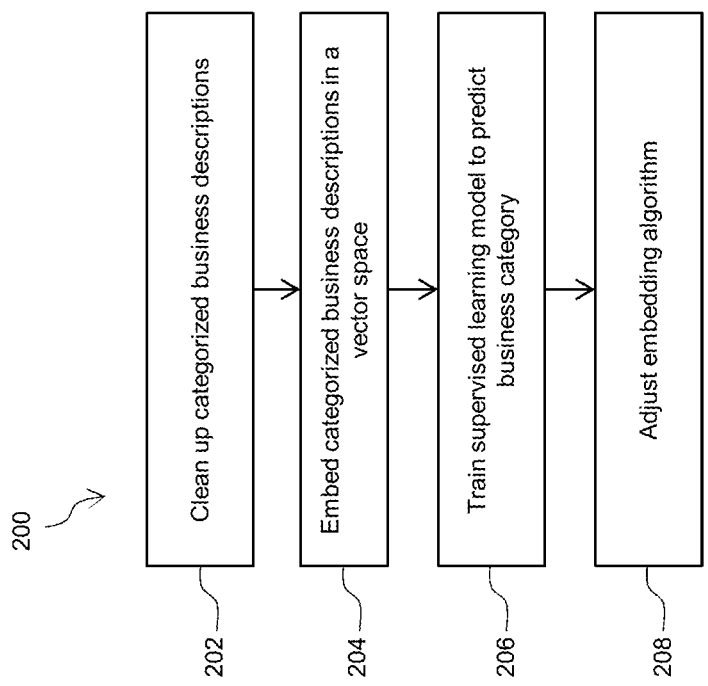
FIG. 2 is a flow diagram showing processing that may occur to train a supervised learning model to predict business categories, according to an embodiment of the present disclosure.

FIG. 2 is a flow diagram showing process 200 that may occur to train a supervised learning model to predict business categories, according to an embodiment of the present disclosure. At block 202, text preparation module 108 may clean up categorized business descriptions. Categorized business descriptions may refer to a business description associated with a business that also has a category assigned to it. This may be in contrast to an uncategorized business description, a business description associated with a business that does not have a category specified. In some embodiments, business descriptions that are cleaned up by text preparation module 108 may be obtained from database 122. In some embodiments, cleaning up a business description may include reducing noise within the description and preparing the text of the description for processing in block 204. Additional details of cleaning up business descriptions are discussed in relation to FIG. 3.

At block 204, embedding module 110 may embed the cleaned up categorized business description to a vector space in a manner similar to or the same as described in relation to embedding module 110 in the context of FIG. 1. Embedding module may apply a word2vec algorithm using a CBOW approach to generate a vector representation of the cleaned up categorized business descriptions. In some embodiments, the vector representation may be a three hundred dimensional vector. The vector representation of the description may be a single vector generated by averaging the vector representation of each word in the description. In some embodiments, the vector representation of the description may be a matrix with each column vector being a vector of a word in the description.

At block 206, a neural network contained in categorization module 114 may be trained to predict a business category using supervised learning. In some embodiments, the neural network may be a fully connected neural network. A fully connected neural network may be a neural network with multiple layers (e.g. three layers) where each neuron in a layer receives input from every element of the previous layer. In some embodiments, the network may have three layers. In some embodiments, the layers may be responsible for the specific prediction task (e.g. category or industry prediction). The dense layers may receive vectors from the pre-trained word2vec models that are sequenced together by the LSTM layer. The layers may "move" the input vector in space to optimize the prediction task. In other words, the layers may learn which vectors belong to the same industry and learn to embed them closer together in the vector space. Training the neural network may include providing examples of embedded business descriptions with known categories. The neural network may learn to predict the business category based on the description embedding. At block 208, the embedding module may adjust the embedding algorithm (e.g., the parameters of the word2vec model) based on the known categories to improve on its embedding abilities. In other words, embedding module 110 may continuously learn, in an unsupervised fashion, how to embed similar descriptions to similar regions within the vector space. Embedding module 110 may also learn how to embed unrelated descriptions to separate regions within the vector space.

Figure 3:
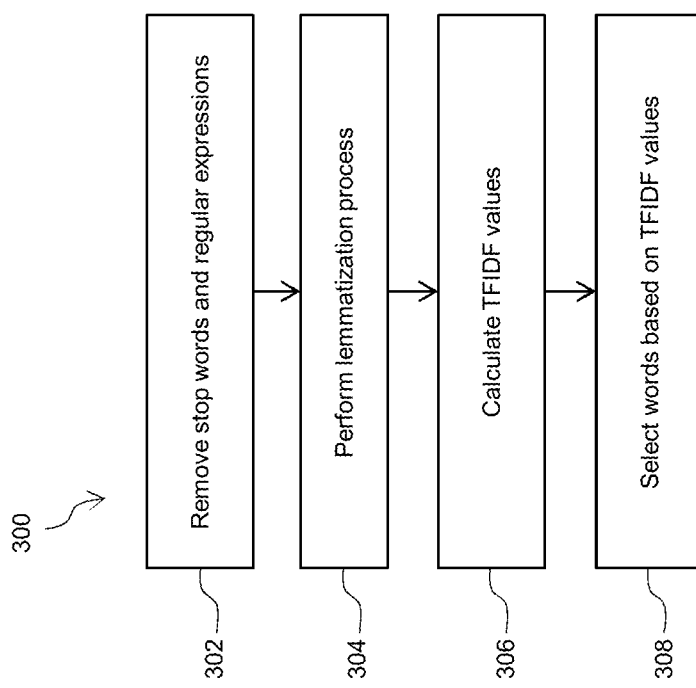
FIG. 3 is flow diagram showing processing that may occur within the system of FIG. 1, according to an embodiment of the present disclosure.

FIG. 3 is flow diagram showing process 300 that may occur within the system of FIG. 1, according to an embodiment of the present disclosure. Process 300 may include steps used within block 202 to clean up a business description. At block 302, text preparation module 108 may remove stop words and regular or non-meaningful expressions within a description. In some embodiments, stop words and expressions to be removed may be pre-defined and then removed via standard natural language processing (NLP) or textual processing techniques. For example, text preparation module 108 may be configured to remove words such as "a", "for", "the", etc. For example, given a phrase, "an exterminating and disinfecting service", text preparation module may remove "an", "and", and "service." The resulting description may then be "exterminating disinfecting." In some embodiments, the removal of stop words may leave business descriptions with only meaningful words in the context of other business descriptions and improve the efficiency, accuracy, and processing speeds of downstream analysis. In some embodiments, a stop words dictionary or list of pre-selected stop words may act as the source of stop words. When a word contained in the dictionary or list is detected, the word may be removed.

At block 304, text preparation module 108 may perform a lemmatization process on the business description. In some embodiments, a lemmatization process may be used to remove inflectional prefixes or suffices of a word and reduce the word to its "base" (i.e., the lemma). For example, the word "walking" may be reduced to "walk" and the word "better" may be reduced to the word "good." In some embodiments, lemmatization may be performed by standard NLP techniques. In some embodiments, a set of pre-defined rules may be applied and the lemmatization may be performed automatically according to the pre-defined rules, such as returning the dictionary form of a word.

At block 306, text preparation module 108 may calculate term frequency-inverse document frequency (TFIDF) values for each word in the description. In some embodiments, text preparation module 108 may calculate the TFIDF value for each word in the description that remains after the stop words have been removed and after the words have been reduced to their lemmas. A TFIDF value may be a decimal that reflects how often a word appears in a set of words. For example, in the phrase "cleaning carpets, cleaning rugs, cleaning clothes", the word "cleaning" would contain a higher TFIDF value than "rugs."

At block 308, text preparation module 108 may select words based on the calculated TFIDF values. In some embodiments, text preparation module may select words with a TFIDF value above a certain, pre-defined threshold. Words with TFIDF values below the threshold may be discarded. In the context of FIG. 2, after a business description has undergone process 300 in block 202, it may proceed for further analysis at block 204.

Figure 4:
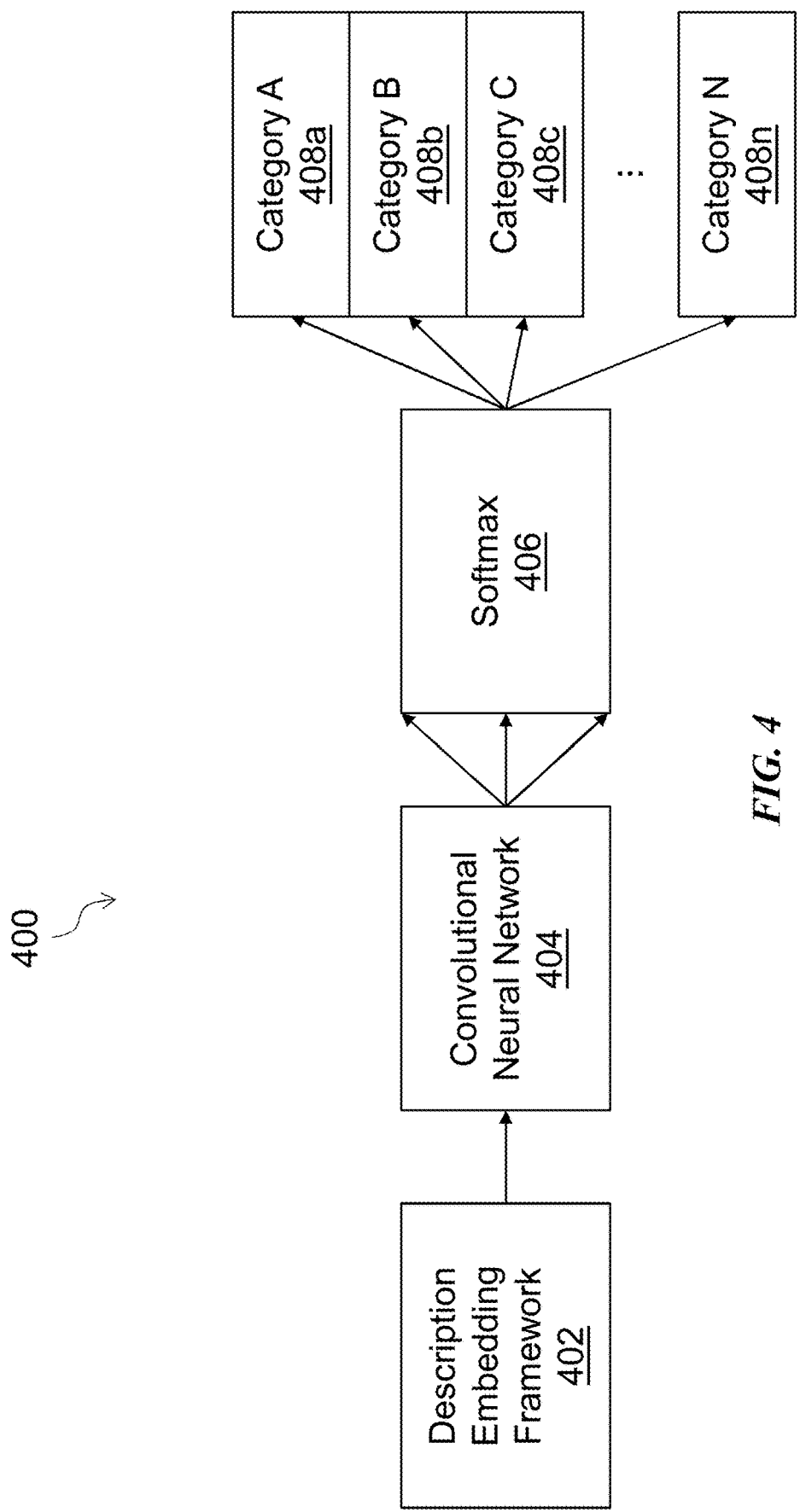
FIG. 4 is an example framework for training a supervised learning mode, according to an embodiment of the present disclosure.

FIG. 4 is an example framework 400 for training a supervised learning mode, according to an embodiment of the present disclosure. In some embodiments, framework 400 may be used within the context of FIGS. 2 and 3. Framework 400 may include a description embedding framework 402, a convolutional neural network 404, a softmax function 406, and/or a plurality of categories 408a-n. In some embodiments, there may be sixteen categories. For example, description embedding framework 402 may be used to embed business descriptions to a vector space as described in block 204. In some embodiments, description embedding framework 402 may also be tunable and may be adjusted, as described in block 208. In some embodiments, training a supervised learning model as described in block 206 may include training convolutional neural network 404. Convolutional neural network 404 may predict a business category for embedded descriptions and the softmax function 406 may map these predictions to a probability. The softmax function may map arbitrary numbers into probabilities that may, in turn, correspond to each category. For example, a business description may be processed by framework 400 and the convolutional neural network 404 and softmax function 406 may output a prediction that there is a 9% likelihood the description corresponds to category A, a 3% likelihood the description corresponds to category B, a 1% likelihood the description corresponds to category C, and an 87% likelihood the description corresponds to category N.

Figure 5:
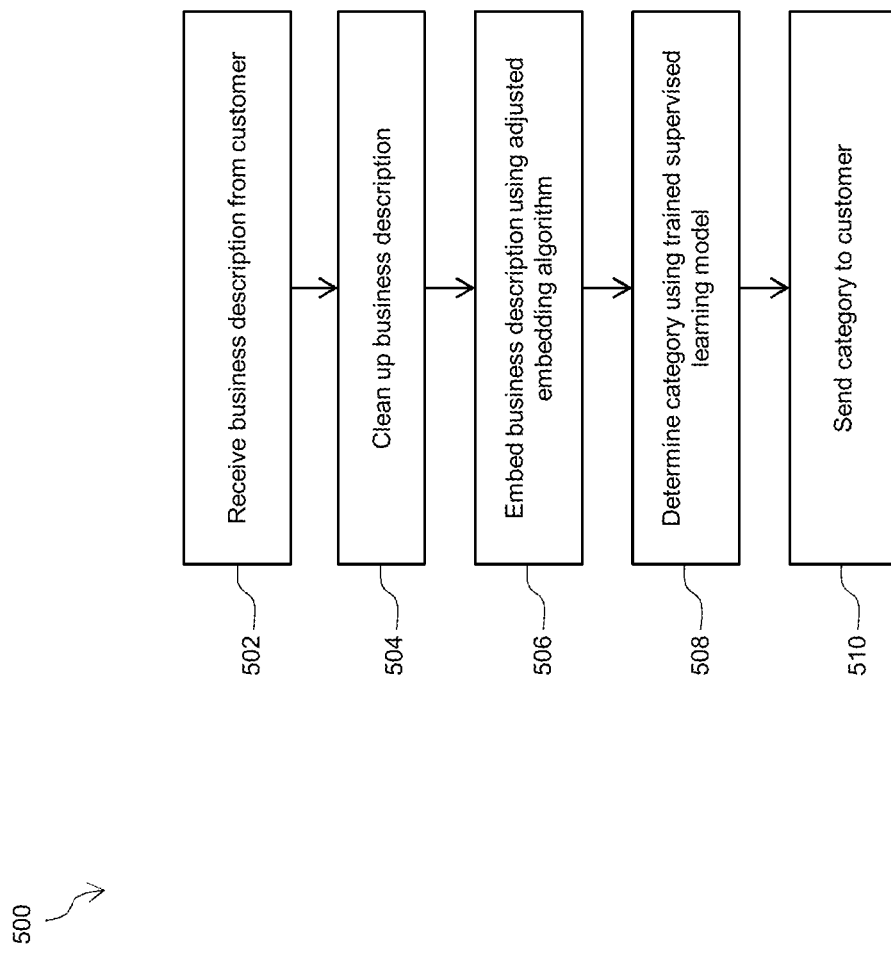
FIG. 5 is a flow diagram showing processing that may occur within the system of FIG. 1, according to an embodiment of the present disclosure.

FIG. 5 is a flow diagram showing process 500 that may occur within the system of FIG. 1, according to an embodiment of the present disclosure. In some embodiments, process 500 may be an application of the neural network trained by the process of FIG. 200. At block 502, server device 106 may receive a business description from a customer. In some embodiments, the description may be received from one of the user devices 102. In some embodiments, the business description may be received in response to prompting a new user/business for a business description upon signup or registration. In some embodiments, the received business description may be stored in the database 122 and indexed according to various other properties associated with the business, such as business ID, title, business address, etc.

At block 504, text preparation module 108 may clean up the business description. In some embodiments, the description may be cleaned up using the processing of FIG. 3. In some embodiments, the cleaning up may occur automatically after server device 106 receives the business description or after the database 122 stores the business description. In some embodiments, the cleaning up may occur in response to a user requesting categorization of their business.

At block 506, embedding module 110 may embed the cleaned up business description using the adjusted embedding algorithm in a manner similar to or the same as described in relation to embedding module 110 in the context of FIG. 1. Embedding module may apply a word2vec algorithm using a CBOW approach to generate a vector representation of the cleaned up categorized business descriptions. In some embodiments, the vector representation may be a three hundred dimensional vector. The vector representation of the description may be a single vector generated by averaging the vector representation of each word in the description. In some embodiments, the vector representation of the description may be a matrix with each column vector being a vector of a word in the description.

At block 508, categorization module 114 may determine a category for the business based on the description using a trained supervised learning model. Categorization module 114 may use the convolutional neural network 404 and softmax function 406 of FIG. 4 to generate a categorization of the description. In some embodiments, the category with the highest probability output from the neural network is the category that the description is assigned to.

At block 510, the category may be sent to the user device 102 associated with the customer. In some embodiments, the category may be displayed on the user device automatically during the registration process or displayed in response to a user requesting its generated category. In some embodiments, server device 106 may cause a functionality to display on user device 102 that allows the user to confirm whether the predicted category is accurate. In some embodiments, the confirmation received from the user may be used to further adjust the embedding framework and/or update the neural network. In some embodiments, the category determined by the neural network may be stored in the database 122 and associated with the business. In some embodiments, the storage may be performed in response to the user confirming the categorization.

Figure 6:
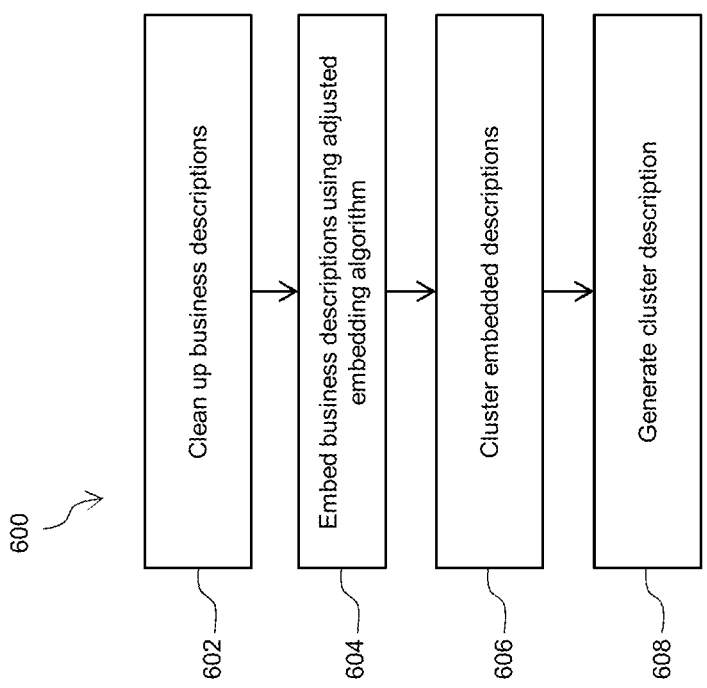
FIG. 6 is a flow diagram showing processing that may occur within the system of FIG. 1, according to an embodiment of the present disclosure.

FIG. 6 is a flow diagram showing process 600 that may occur within the system of FIG. 1, according to an embodiment of the present disclosure. In some embodiments, process 600 may be used to cluster business descriptions and generate representative descriptions for each cluster. In some embodiments process 600 may use a similar framework (e.g., the adjusted embedding frameworks) to FIGS. 2 and 4. At block 602, text preparation module 108 may clean up a plurality of business descriptions. In some embodiments, the business descriptions may be obtained from database 122. In some embodiments, text preparation module 108 may clean up all business descriptions stored in database 122. Block 602 may include a cleaning process such as the one described in relation to FIG. 3.

At block 604, embedding module 110 may embed the cleanup business descriptions to a vector space. In some embodiments, embedding module 110 may use the adjusted embedding algorithm of block 208 in FIG. 200 and may operate in a manner similar to or the same as described in relation to embedding module 110 in the context of FIG. 1. Embedding module may apply a word2vec algorithm using a CBOW approach to generate a vector representation of the cleaned up categorized business descriptions. In some embodiments, the vector representation may be a three hundred dimensional vector. The vector representation of the description may be a single vector generated by averaging the vector representation of each word in the description. In some embodiments, the vector representation of the description may be a matrix with each column vector being a vector of a word in the description.

At block 606, clustering module 112 may cluster the embedded descriptions (i.e., cluster the vectors corresponding to each description in the vector space). In some embodiments, clustering module 112 may apply a mean-shift clustering algorithm to cluster the business description vectors. Mean-shift clustering algorithms may place a weighing function/kernel at each point in the vector space, where each weighing function/kernel has an associated bandwidth parameter. Adding up every kernel may generate a probability surface. The mean-shift algorithm may iteratively shift each kernel to a higher density region in the vector space until it achieves convergence. When convergence is reached, which depends on the bandwidth (the bandwidth reflects the "width" or "scope" of the cluster), all points or vectors that reside within the cluster may be associated with that cluster. Any number of cluster may be generated in the vector space. Because the clustering module 112 is generating clusters of vectors that have been mapped from business descriptions, it can recognize that similar vectors (and thus similar descriptions) should be in the same cluster. In some embodiments, clustering module 112 may use hierarchical clustering analysis to generate a hierarchy of clusters.

At block 608, cluster analysis module 116 may generate a description that represents each cluster. In some embodiments, this description may be in natural language or normal text, and not in vector format. In some embodiments, generating a description that represents each cluster may include combining up to three original descriptions (prior to any processing) that contain a certain, pre-defined amount of the words with the highest TFIDF values, as calculated at block 602. For example, cluster analysis module 116 may, based on the vectors within a generated cluster, obtain the textual business descriptions associated with each vector. Cluster analysis modules 116 may determine up to three descriptions that contain 95% of the words with the five highest TFIDF values. In some embodiments, the percentage and the number of highest TFIDF values may be adjusted according to how narrow/broad and long/short the cluster descriptions are desired to be. In some embodiments, cluster analysis module 116 may combine fewer or more than three descriptions to generate the representative description. The phrase or group of text resulting from the combined descriptions may be used as a description for the associated cluster.

The representative description may also be assigned to every business with an associated description vector within the cluster. In some embodiments, the representative description may replace the user provided description associated with each business in the database 122.

Figure 7:
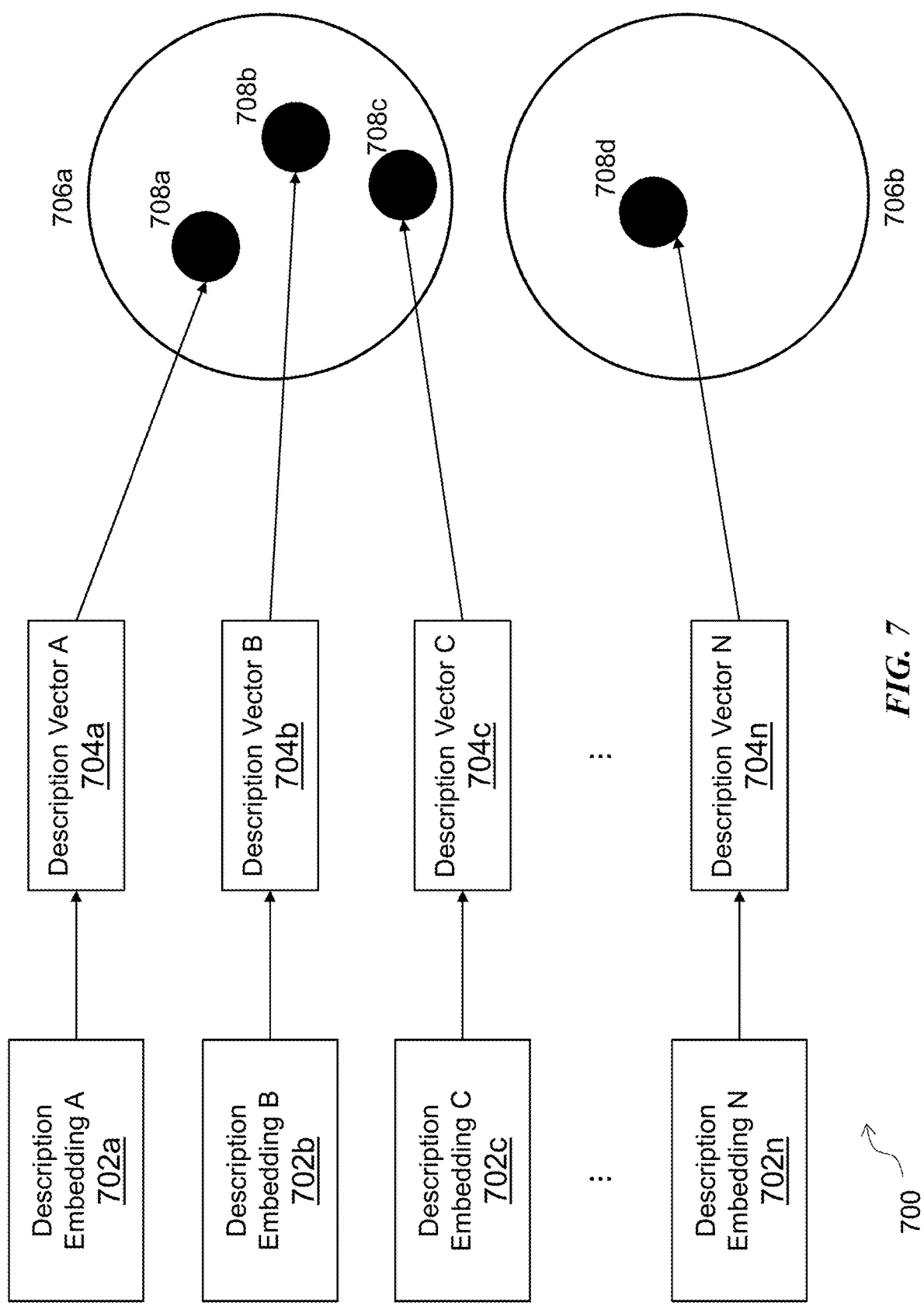
FIG. 7 is an example framework for clustering, according to an embodiment of the present disclosure.

FIG. 7 is an example framework 700 for clustering, according to an embodiment of the present disclosure. In some embodiments, framework 700 may be a visualization of process 600 and may describe operations performed by embedding module 110, clustering module 112, and cluster analysis module 116. Framework 700 may include a plurality of description embeddings 702a, 702b, . . . , 702n (702 generally). Each description embedding 702 may be operated by embedding module 110. In some embodiments, each description embedding 702 may operate a process similar to that mentioned in block 604 (e.g., with the adjusted embedding algorithm of FIG. 200). In some embodiments, description embedding 702 may all be included in embedding module 110. Each embedding 702 may generate a description vector 704, corresponding to a plurality of business descriptions, such as the business descriptions normally maintained in database 122. Framework 700 may include clusters 706a and 706b and description vectors 708a-d. In framework 700, vectors 708a-c have been assigned to cluster 706a, while vector 708d has been assigned to cluster 708d. In some embodiments, clusters 706a and 706b may have been generated by a mean-shift clustering algorithm. For example, vector 708d may be a vector corresponding to the description, "pool cleaning." Vectors 708a, 708b, and 708c may be vectors corresponding to descriptions, "electrical contractors", "refrigeration repair shop", and "air conditioning and heating contractors."

Figure 8:
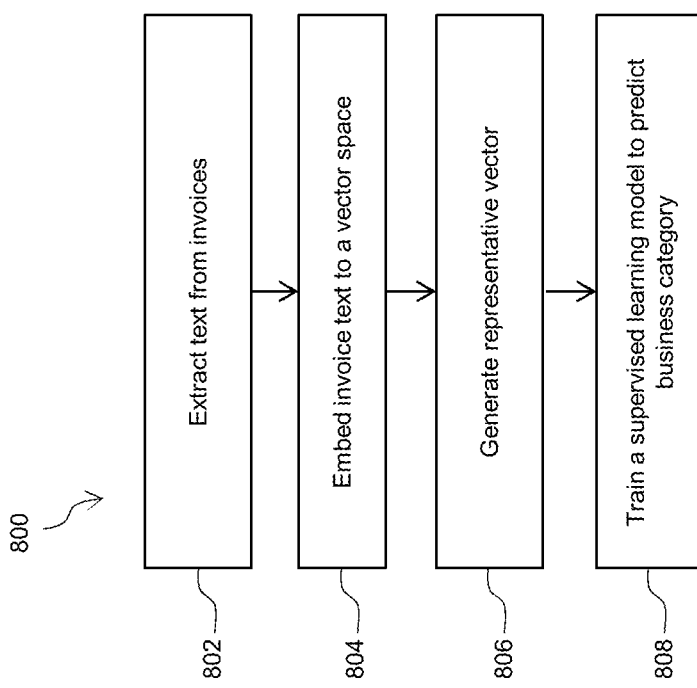
FIG. 8 is a flow diagram showing processing that may occur within the system of FIG. 1, according to an embodiment of the present disclosure.

FIG. 8 is a flow diagram showing process 800 that may occur within the system of FIG. 1, according to an embodiment of the present disclosure. In some embodiments, process 800 may be used to train a supervised learning model to categorize a business based on analyzing the business's invoices. In some embodiments, process 800 may be used to train a supervised learning model to predict a description of a business based on the business's invoices, such as the reduced space descriptions generated in FIGS. 6 and 7. At block 802, invoice preparation module 118 of system 100 may extract text from a plurality of invoices. In some embodiments, invoice preparation module 118 may extract text from all invoices within database 122 (e.g., the invoices for all businesses/users that are registered with an accounting software). In some embodiments, invoice preparation module 118 may only extract text from invoices of businesses that have provided a category for their business. Invoice preparation module 118 may utilize various standard techniques for extracting the invoice text and maintaining it in structured format, such as optical character recognition (OCR) techniques. In some embodiments, the format of the extracted text may retain the structure of the original invoice. An invoice may have a number of line items (e.g., a list of numbered transactions, each one including a description of the product/service, a price, a customer, a location, etc.).

At block 804, embedding module 110 may embed the extracted text from each invoice to a vector within a vector space. In some embodiments, embedding module 110 may use a word2vec algorithm, such as the adjusted word2vec algorithm of FIGS. 5 and 6 and may operate in a manner similar to or the same as described in relation to embedding module 110 in the context of FIG. 1. Embedding module may apply a word2vec algorithm using a CBOW approach to generate a vector representation of the extracted text. In some embodiments, the vector representation may be a three hundred dimensional vector. The vector representation of the text may be a single vector generated by averaging the vector representation of each word in the text. In some embodiments, the vector representation of the text may be a matrix with each column vector being a vector of a word of the text. In some embodiments, embedding module 110 may embed each line item of an invoice separately, generating a plurality of line item vectors for each invoice.

At block 806, embedding module 110 may generate a representative vector for a business based on its associated invoices that were processed in blocks 802 and 804, from database 122. For example, invoice preparation module 118 may recognize a plurality of invoices from a specific business, Business A, and may generate a single vector representing Business A based on these invoices. After extracting the text (block 802) from each invoice associated with Business A, embedding module 110 may, as described in relation to block 804, embed the text of each line item of each invoice to a vector. In some embodiments, generating a representative vector for Business A may include analysis and processing of the plurality of vectors for each line item of each invoice of Business A. Invoice preparation module 118 may combine words (in vector format or in the vector space) within each line item using a long short-term memory (LSTM) layer. In some embodiments, this may reduce redundancy and improve efficiency and accuracy of downstream processing. Invoice preparation module 118 may also utilize a convolutional neural network to combine line item vectors within the same invoice to create a vector representing that invoice. In some embodiments, the convolutional neural network may be configured to add or subtract the plurality of line item vectors with various weights to create a single vector representing the invoice. Invoice preparation module 118 may then combine all invoice vectors associated with Business A to generate a vector representing Business A. In some embodiments, this may include averaging every invoice vector associated with Business A.

At block 808, a supervised learning model may be trained to predict a business's category or reduced space description based on the business vector generated at block 806. The model may be trained by providing a plurality of example pairs of business vectors and categories or business vectors and descriptions; these example pairs may be labeled and may be referred to as "training data" that the neural network uses to "learn." In some embodiments, a softmax layer may also be trained to map each prediction to a probability, such as softmax function 910 of FIG. 9. The model may learn to weigh all components of the business vector to make a prediction. In some embodiments, the model may be contained in the categorization module 114 of system 100. In some embodiments, invoice preparation module 118 may also be configured to obtain additional relational data related to the invoices from the database 122 and send the relational data to embedding module 110 to be embedded into invoice vectors or the company vector. Relational data may include percentiles of transaction amounts, frequencies of different range of transaction amount values, etc. In some embodiments, bank transactions may also be obtained by invoice preparation module 110 and blocks 802 and 804 may apply to the bank transactions. In the case where bank transaction vectors are also created, at block 806, the vector representing the business may take into account bank transaction vectors along with invoice vectors. In some embodiments, text preparation module 108 may clean up the extracted text in a manner similar to or the same as described in relation to process 300 before embedding module 110 embeds the text to a vector space (block 804).

Figure 9:
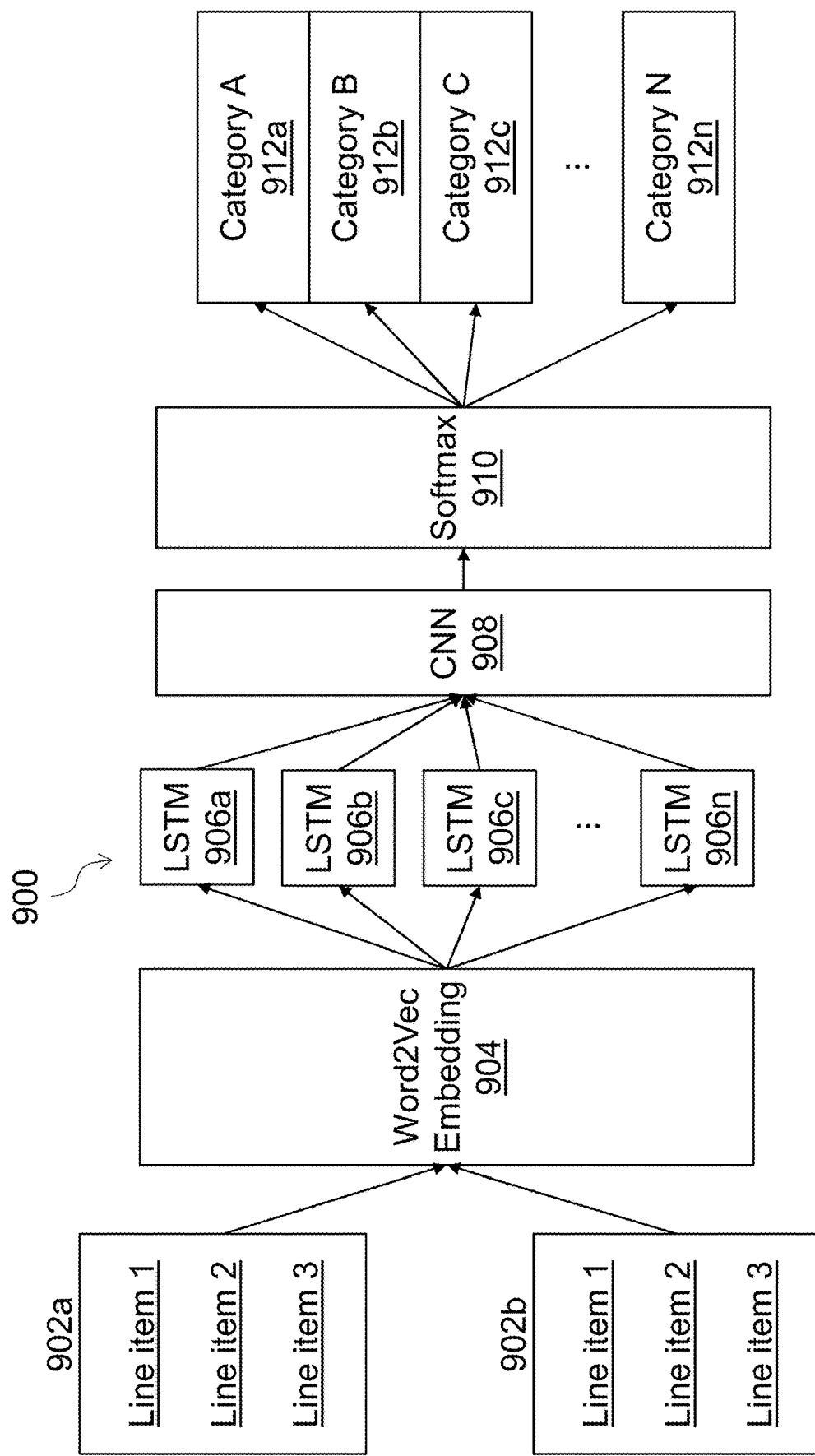
FIG. 9 is another example framework for training a supervised learning model, according to an embodiment of the present disclosure.

FIG. 9 is another example framework 900 for training a supervised learning model, according to an embodiment of the present disclosure. In some embodiments, framework 900 may be the supervised learning model that is trained according to the process 800 of FIG. 8. Framework 900 may include a plurality of invoices 902a and 902b. Framework 900 is not limited to two invoices and may analyze a large number of invoices associated with many users or businesses within the software environment. Invoice 902a includes three line items as an example, although typical invoices may include any number of line items. Text extraction modules or processes are not shown in FIG. 9. The invoices 902 and associated line items move to the word2vec embedding 904, where each line item may be converted into a vector format, as described in relation to block 804. The LSTM layers 906a-n combine words within single line items for the invoices in the vector space. In some embodiments, the LSTM layers 906a-n may be encompassed in a single LSTM layer. Convolutional neural network (CNN) 908 may receive the plurality of line item vectors, combine them into a single vector representing each invoice, and combine the vectors representing each invoice associated with a business into a single vector representing the business, as described in block 806. The CNN 908 may also be trained to categorize a business based on the business vector it generates, as described in block 808. In some embodiments, framework 900 may include a softmax function 910 to smooth the predictions from the CNN 908. This may include mapping each prediction to a probability associated with the output categories 912a-n.

Figure 10:
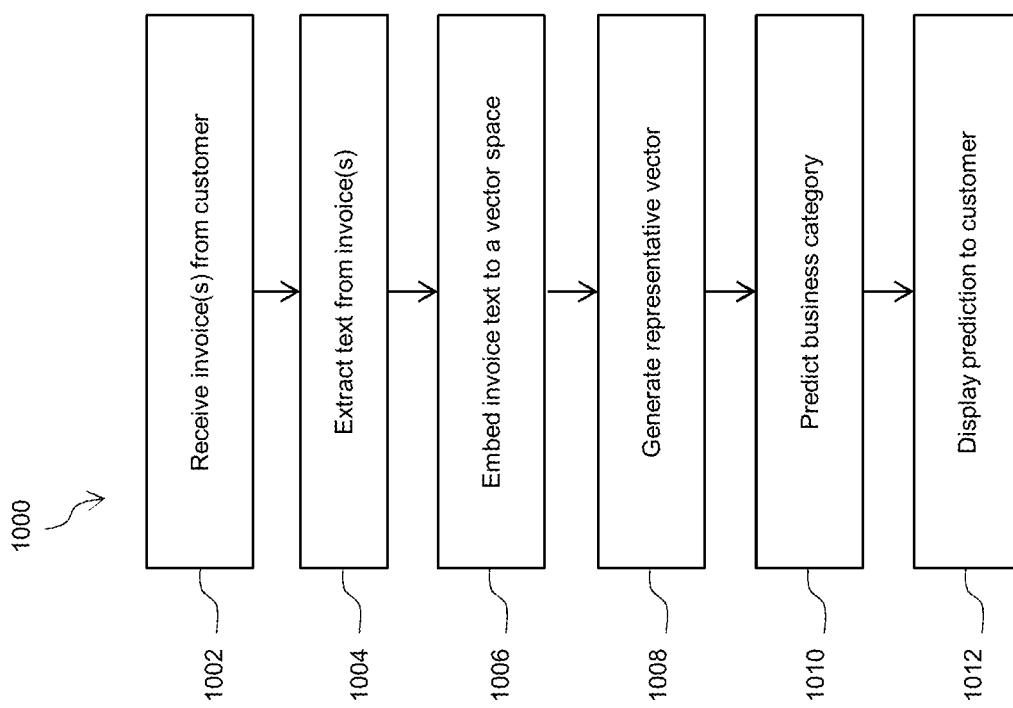
FIG. 10 is a flow diagram showing processing that may occur within the system of FIG. 1, according to an embodiment of the present disclosure.

FIG. 10 is a flow diagram showing process 1000 that may occur within the system of FIG. 1, according to an embodiment of the present disclosure. In some embodiments, process 1000 may be an application of the neural network architecture described in FIGS. 8 and 9, the process being used to assign a category or description to a new business or user upon registering for an accounting software. At block 1002, server device 106 may receive an invoice from a customer for their business. In some embodiments, server device 106 may receive a plurality of invoices. Server device 106 may receive the invoices from one or more of the plurality of user devices 102, such as by receiving an uploaded image or PDF file of an invoice.

At block 1004, invoice preparation module 118 may extract text from the one or more invoices associated with the new business. In some embodiments, text may be extracted using standard text extraction techniques, such as OCR.

At block 1006, embedding module 110 may embed the invoice text to a vector space. Embedding module 110 may operate in a manner similar to or the same as described in relation to embedding module 110 in the context of FIG. 1. Embedding module may apply a word2vec algorithm using a CBOW approach to generate a vector representation of the invoice text. In some embodiments, the vector representation may be a three hundred dimensional vector. The vector representation of the invoice text may be a single vector generated by averaging the vector representation of each word in the invoice text. In some embodiments, the vector representation of the invoice text may be a matrix with each column vector being a vector of a word in the invoice text. Embedding module 110 may embed each line item of each vector to a vector space, creating a plurality of line item vectors for each invoice. In some embodiments, text preparation module 108 may clean up the extracted text in a manner similar to or the same as described in relation to process 300 before embedding module 110 embeds the text to a vector space (block 1006).

At block 1008, invoice preparation module 118 may generate a representative vector. In some embodiments, the representative vector may be a vector representing the business and may be generated in the same manner or similar to the manner of block 806 in FIG. 8. The representative vector may be generated based on the invoice vectors generated in block 1006 for the invoices received in block 1002.

At block 1010, categorization module 114 may use the trained convolutional neural network framework, such as the one trained in process 800 and/or shown in framework 900, to predict a business category based on the representative vector generated in block 1008. In some embodiments, block 1010 may also include predicting a business description within the reduced business description space as described in relation to block 808.

At block 1012, server device 106 may cause the predicted category or description to be displayed to a customer on one or more user devices 102. In some embodiments, this may occur automatically upon completion of blocks 1002-1010. In some embodiments, the prediction may simply be assigned to the business and stored in database 122 and may be displayed to a user upon request.

Figure 11:
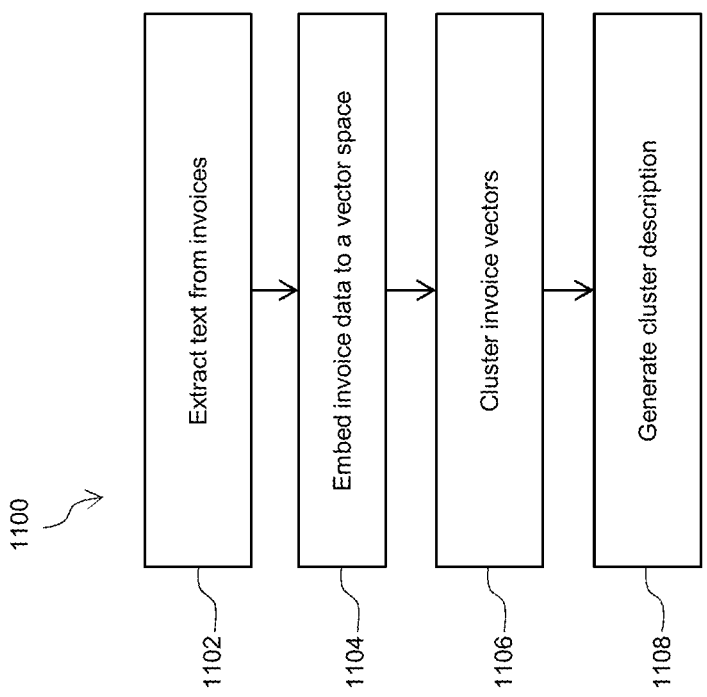
FIG. 11 is a flow diagram showing processing that may occur within the system of FIG. 1, according to an embodiment of the present disclosure.

FIG. 11 is a flow diagram showing process 1100 that may occur within the system of FIG. 1, according to an embodiment of the present disclosure. In some embodiments, process 1100 may be used to generate and standardize offered products and services for selection by businesses registered with a business accounting software. At block 1102, invoice preparation module 118 may extract text from a plurality of invoices. In some embodiments, the invoices may be all invoices associated with users or businesses of an accounting software stored in database 122. The text extraction may be performed according to standard text extraction techniques including, but not limited to, OCR techniques.

At block 1104, embedding module 110 may embed the invoice data or text to a vector space. In some embodiments, the processing of block 1104 may include some operations similar to or the same as described in relation to embedding module 110 in the context of FIG. 1. Embedding module may apply a word2vec algorithm using a CBOW approach to generate a vector representation of the invoice data. In some embodiments, the vector representation may be a three hundred dimensional vector. The vector representation of the invoice data may be a single vector generated by averaging the vector representation of each word in the invoice data. In some embodiments, the vector representation of the invoice data may be a matrix with each column vector being a vector of a word in the invoice data. In some embodiments, block 1104 may also include utilizing an LSTM layer to combine words, in the vector format, within the same line item. In some embodiments, text preparation module 108 may clean up the extracted text in a manner similar to or the same as described in relation to process 300 before embedding module 110 embeds the text to a vector space (block 1104).

At block 1106, clustering module 112 may cluster the plurality of line item invoice vectors. In some embodiments, the processing performed prior to block 1106, may be the same as or similar to the processing described in block 606 of FIG. 6. In other words, the clustering module 112 may cluster vectors received from a word2vec embedding followed by an LSTM layer, such as in framework 900. In some embodiments, clustering module 112 may form clusters in the vector space based on the invoice vectors according to a mean-shift clustering algorithm, similar to or the same as described in relation to block 606 of process 600.

At block 1108, cluster analysis module 116 may generate a cluster description for each cluster. In some embodiments, generating a cluster description for clusters of services, as described here may include similar operations as generating a cluster description for clusters of business descriptions as discussed in relation to block 608 of FIG. 6. In some embodiments, cluster analysis module 116 may analyze the text corresponding to each line item vector within a cluster. Cluster analysis module 116 may calculate a TFIDF value for each word within the cluster. In some embodiments, the TFIDF value may be calculated in relation to the entire cluster, as opposed to the TFIDF value being calculated in relation to the line item that contains the word. Cluster analysis module 116 may identify the highest scoring words and combine them to generate a representative description of the cluster. In some embodiments, cluster analysis module 116 may choose a pre-defined number of top scoring words, such as the top five or ten words with the highest score. In some embodiments, cluster analysis module 116 may select all words with a TFIDF value above a certain threshold (e.g. 0.75). In some embodiments, performing process 1100 on the invoices of database 122 may allow for a standardized and more accurate list of service and product offerings to be accounted for within an accounting software environment.

Figure 12:
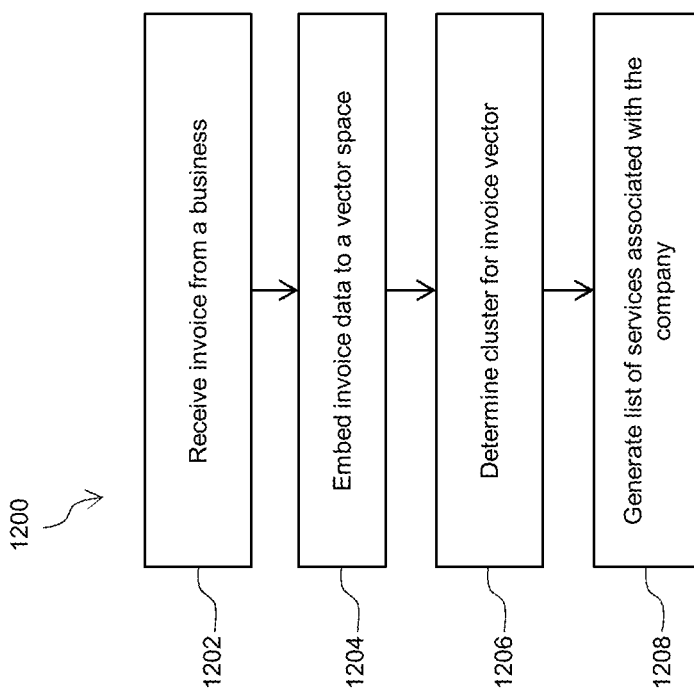
FIG. 12 is a flow diagram showing processing that may occur within the system of FIG. 1, according to an embodiment of the present disclosure.

FIG. 12 is a flow diagram showing process 1200 that may occur within the system of FIG. 1, according to an embodiment of the present disclosure. In some embodiments, process 1200 may be used to generate a list of services associated with a business upon registration using the clusters and associated cluster descriptions generated in FIG. 11. At block 1202, server device 106 may receive an invoice from a business or user from one of user devices 102. In some embodiments, server device 106 may receive a plurality of invoices associated with the business. In some embodiments, the invoices may be received in response to the business or user registering for an accounting software. Server device 106 may cause a notification or message to be displayed on user device 102 prompting the user to upload invoices associated with the business.

At block 1204, embedding module 110 may embed the invoice text to vectors within a vector space. In some embodiments, embedding module 110 may create line item vectors for the received invoices by embedding each line item of each invoice to a vector within the vector space. In some embodiments, the vector space may be the same vector space to which the invoices were embedded to in process 1100 and the same vector space in which the generated clusters of process 1100 reside. Block 1204 may include operations similar to or the same as described in relation to embedding module 110 in the context of FIG. 1. Embedding module may apply a word2vec algorithm using a CBOW approach to generate a vector representation of the invoice text. In some embodiments, the vector representation may be a three hundred dimensional vector. The vector representation of the invoice text may be a single vector generated by averaging the vector representation of each word in the invoice text. In some embodiments, the vector representation of the invoice text may be a matrix with each column vector being a vector of a word in the invoice text. In some embodiments, text preparation module 108 may clean up the invoice data in a manner similar to or the same as described in relation to process 300 before embedding module 110 embeds the text to a vector space (block 1204).

At block 1206, cluster analysis module 116 may identify all clusters within the vector space to which the line item vectors of the business have been mapped to. In some embodiments, cluster analysis module 116 may calculate the Euclidean distance from each cluster's center (or a cluster's closest edge) to identify the clusters in which the line item vector applies. In some embodiments, if a Gaussian mixture model was used to originally form the clusters, the parameters of the mixture can be used to identify the applicable cluster for each line item. At block 1208, cluster analysis module 116 may generate a list of services associated with the business by obtaining the description of each cluster identified in block 1206.

As an example of process 1200, a landscaping business may have submitted two invoices to an accounting software server, each invoice containing ten line items. At block 1204, ten line item vectors would be created for each invoice, meaning twenty total line item vectors (e.g., service vectors or product vectors) and mapped to a vector space. Of the twenty line items, five may be for transactions related to "pool cleaning," five may be related to "pool filter cleaning," and ten may be related to "landscaping." When the vectors are mapped to the vector space, they may be contained in three distinct clusters, with descriptions "pool cleaning," "filter cleaning," and "landscaping." A resulting list may be generated in block 1208 including the three cluster descriptions and then associated with the landscaping business in the database 122. In some embodiments, the list may be displayed to the business when interacting with the software. In previous systems, it may be very difficult and often not worth the expense to distinguish between pool cleaning and pool filter cleaning without manual intervention. But in a business database with thousands of businesses with extensive service offerings and invoice collections, it may be even more difficult to do so.

Figure 13:
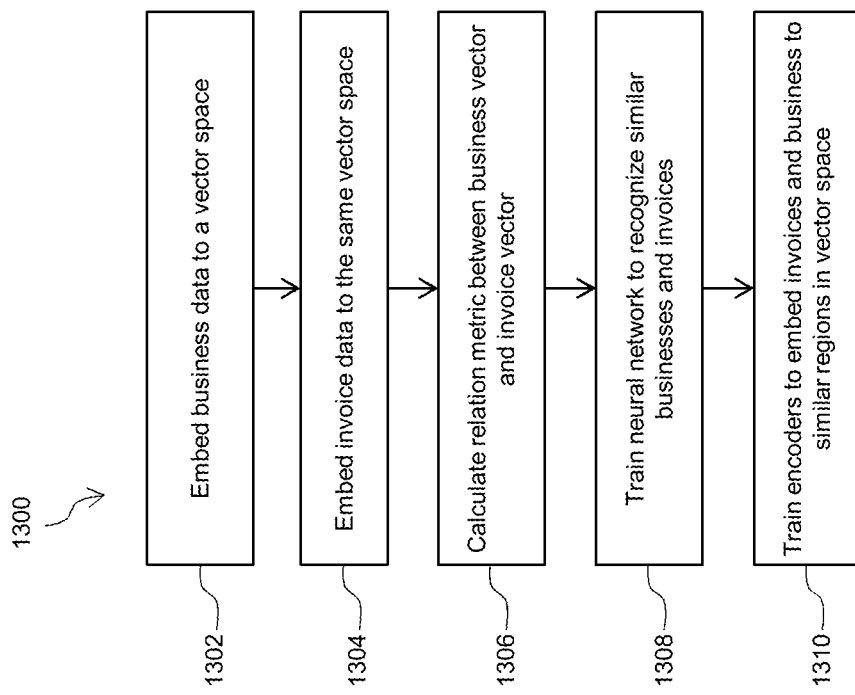
FIG. 13 is a flow diagram showing processing that may occur within the system of FIG. 1, according to an embodiment of the present disclosure.

FIG. 13 is a flow diagram showing process 1300 that may occur within the system of FIG. 1, according to an embodiment of the present disclosure. In some embodiments, process 1300 may be used to train a neural network and encoder architecture to recognize related pairs of business descriptions and invoices. At block 1302, embedding module 110 may embed business data to a vector space. In some embodiments, business data may include a business category or description, a business ID, and other characteristics such as a geographic location. Embedding module 110 may convert the business data to vector format in a vector space using an encoder.

At block 1304, embedding module 110 may embed invoice data from invoices associated with the aforementioned business to the same vector space. In some embodiments, embedding module 110 may use a second encoder for embedding invoice data. The second encoder may also apply a word2vec algorithm, although it may be a separate algorithm from the one used to embed the business data in block 1302. In other words, the two encoders may utilize word2vec algorithms with separate sets of parameters that may each be separately tunable according to the learning process. In some embodiments, the embedding that encodes the invoice data to a vector space may encode the entire invoice as a single vector by encoding the text, amounts, and other info contained in the invoice. In some embodiments, the second encoder may also embed each line item of the invoice separately and combine the line item vectors to create a representative vector for the invoice, similar to as described in FIG. 11.

Blocks 1302 and 1304 may operate in a manner similar to or the same as described in relation to embedding module 110 in the context of FIG. 1. Embedding module may apply a word2vec algorithm using a CBOW approach to generate a vector representation of the business/invoice data. In some embodiments, the vector representation may be a three hundred dimensional vector. The vector representation of the business/invoice data may be a single vector generated by averaging the vector representation of each word in the business/invoice data. In some embodiments, the vector representation of the business/invoice data may be a matrix with each column vector being a vector of a word in the business/invoice data. In some embodiments, text preparation module 108 may clean up the business data in a manner similar to or the same as described in relation to process 300 before embedding module 110 embeds the text to a vector space (block 1304).

At block 1306, relation metric calculator 120 may calculate a relation metric between the business vector and the invoice vector. In some embodiments, the relation metric may be calculated by calculating an inner product between the two vectors. In some embodiments, the relation metric may be calculated by multiplying the inner product by a sigmoid function, keeping the metric between zero and one.

At block 1308, a neural network may be trained to recognize whether businesses and invoices are related based on the relation metric calculated between the two. In some embodiments, the neural network may be trained in an end-to-end fashion. In some embodiments, training the neural network may include providing a plurality of related business-invoice pairs and associated relation metrics and unrelated business-invoice pairs and associated relation metrics. The neural network may learn to predict whether business-invoice pairs are related based on the relation metric calculated between the two and adjust the parameters of the sigmoid function.

At block 1310, the encoders are trained to embed invoices and business data, respectively, to similar regions in the vector space. The encoders may learn, based on the provided positive and negative samples, how to embed similar businesses to the same regions and similar invoices to the same region, and vice versa. This may be a benefit of training the network in an end-to-end fashion; back-propagation may help both ends of the network learn (e.g., both the prediction portion and the encoding portion). Back-propagation algorithms may include gradient-based learning processes for training multilayer networks. Back-propagation algorithms may include computing gradients of a loss function with respect to each weight in a layer, wherein the weights within each layer are tuned to generate accurate predictions. In some embodiments, the weights may be used within the neural network architecture to embed text to vector spaces and to make other prediction as discussed herein. In some embodiments, end-to-end training may include iterative forward and backward propagation to jointly train the entire network architecture. The same region may include a region compact enough such that the vectors within the region, when used to calculate a relation metric, are determined to be related. On the contrary, the encoders may learn to embed unrelated invoices and businesses data to different regions in the vector space. Different regions may include regions that are far enough apart such that a relation metric calculated between each region would yield a determination that they are unrelated.

Figure 14:
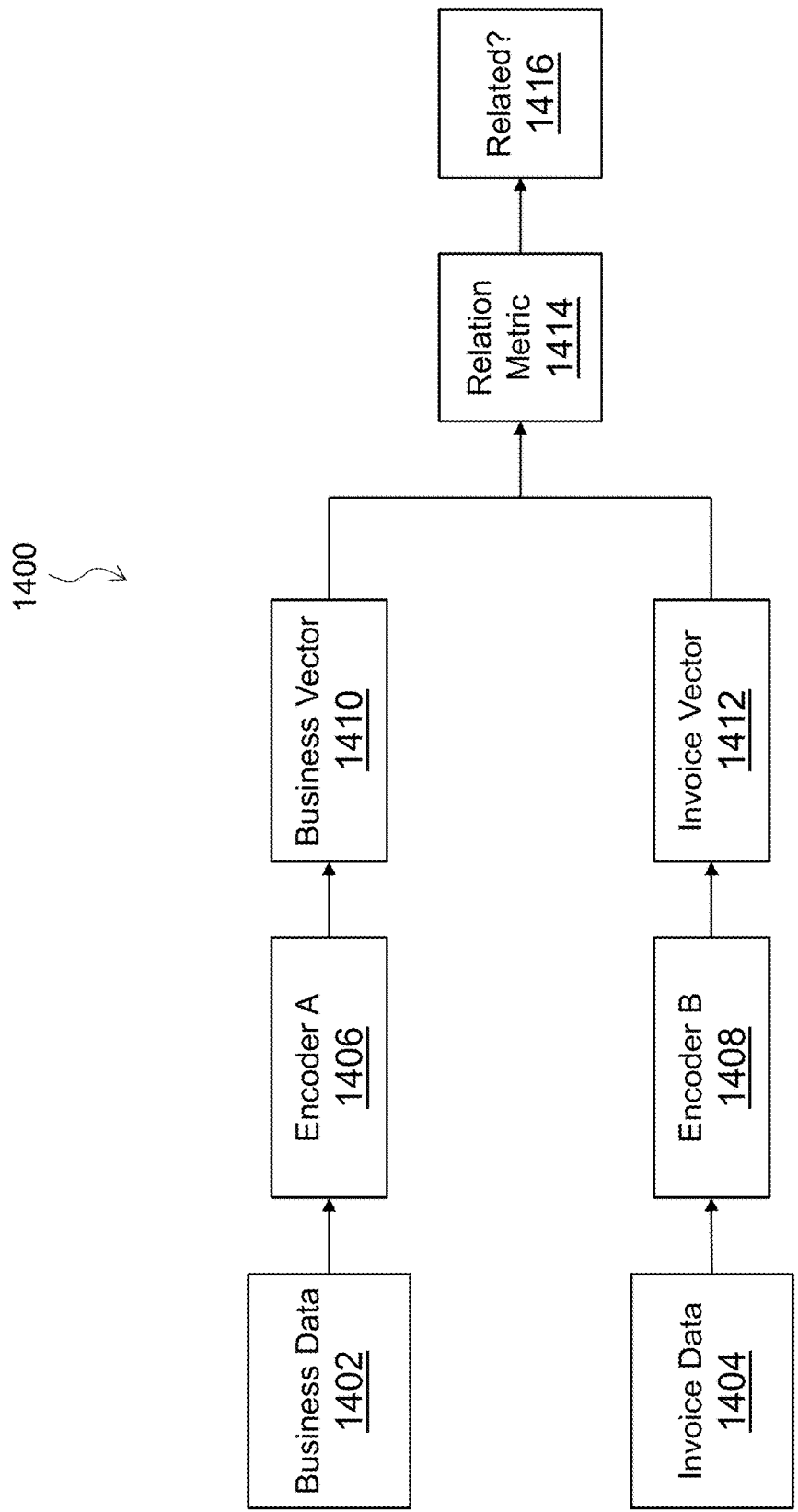
FIG. 14 is an example framework for training a model, according to an embodiment of the present disclosure.

FIG. 14 is an example framework 1400 for training a model, according to an embodiment of the present disclosure. Framework 1400 may be a visualization of the framework that may apply process 1300 to train a network architecture. In framework 1400, inputs may include business data 1402 and invoice data 1404. Business data 1402 may include data such as business categories, business descriptions, business IDs, geographic locations, etc. Business data 1402 may be obtained from a database that stores information for users or businesses of an accounting software, such as database 122. Invoice data 1404 may include invoices stored in database 122 associated with businesses or users of an accounting software. In some embodiments, for training the network, each supplied pair of business data 1402 and 1404 may include an indication of whether the pair is related or unrelated. In some embodiments, the indication may be a binary number, such as zero (corresponding to unrelated) and one (corresponding to related).

Encoder A 1406 may be configured to embed the business data 1402 to a vector space, creating business vector 1410. In some embodiments, encoder 1406 may apply a trained word2vec algorithm such as described in relation to block 1304 of FIG. 13. Encoder B 1408 may be configured embed the invoice data 1404 to a vector space, creating invoice vector 1412. In some embodiments, encoder 1408 may apply a trained word2vec algorithm such as described in relation to block 1304. In some embodiments, encoders 1406 and 1408 may contain separate word2vec algorithms. In other words, encoders 1406 and 1408 may include word2vec algorithms with separate and distinct sets of parameters. Each encoder may be separately tunable to take advantage of the end-to-end learning fashion applied in process 1300. Both encoders may include a neural network for performing the vector space embedding. At the relation metric block 1414, a relation metric (such as the one described in block 1306) may be calculated between the business vector 1410 and the invoice vector 1412. The relation metric 1414 may include an inner product between the two vectors multiplied by a sigmoid to smooth the function and limit the output to stay between zero and one. Block 1416 may include a neural network learning to predict whether an invoice-business data pair is related or unrelated based on the relation metrics 1414 and the indications of related/unrelated pairs provided to the framework.

Figure 15:
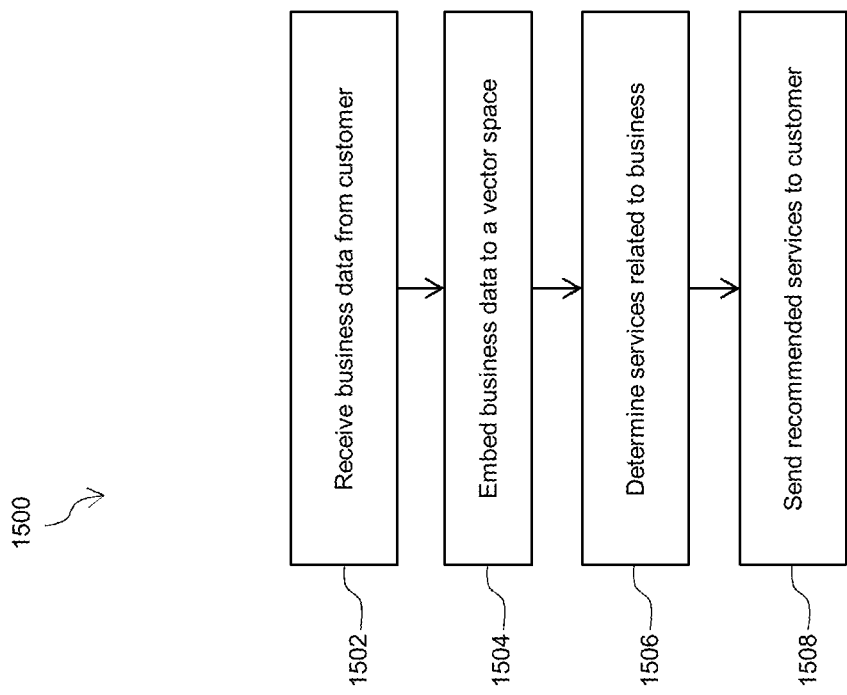
FIG. 15 is a flow diagram showing processing that may occur within the system of FIG. 1, according to an embodiment of the present disclosure.

FIG. 15 is a flow diagram showing process 1500 that may occur within the system of FIG. 1, according to an embodiment of the present disclosure. Process 1500 may be used to generate service recommendations to a new business or user upon registering with an accounting software. In some embodiments, process 1500 may be performed in response to any user or business (whether they are new or not) requesting a list of recommended services. For example, a request may be submitted via a user interface on user device 102 and sent to server device 106 via network 104. At block 1502, embedding module 110 may receive business data associated with a customer or business. In some embodiments, embedding module 110 may extract business data from database 122.

At block 1504, embedding module 110 may embed the business data to a vector space, such as in the fashion described in block 1304 or 204. In some embodiments, block 1504 may be performed with tuned encoders, such as the encoders trained in an end-to-end learning fashion in block 1310. The output of block 1504 may be a business vector. In some embodiments, text preparation module 108 may clean up the received business data in a manner similar to or the same as described in relation to process 300 before embedding module 110 embeds the text to a vector space (1504).

At block 1506, relation metric calculator 120 may determine services related to the business based on the business vector generated in block 1504. Relation metric calculator 120 may calculate a relation metric between the business vector and a plurality of invoice vectors associated with other businesses that are contained within the vector space. In some embodiments, the plurality of invoice vectors may include all invoice vectors associated with all other businesses that are registered with the accounting software and stored in database 122. In some embodiments, the plurality of invoice vectors for which relation metrics are calculated may include only invoices associated with businesses within the same category, location, or the like. Relation metric calculator 120 may then determine invoices that are related to the business based on the plurality of relation metrics by analyzing the calculated relation metrics with the neural network trained in FIGS. 13 and 14. The neural network may generate predictions for the plurality of relation metrics calculated by relation metric calculator 120.

In response to determining services related to the business, at block 1508, server device 106 may send the recommended services to the customer (e.g., to a user device 102 associated with the customer). In some embodiments, for each invoice vector determined to be related to the business with the neural network at block 1506, server device 106 may extract text or other data from the actual invoice associated with the invoice vector and send the extracted text or other data to the user device 102. In some embodiments, the text or other data may be anonymized so as to preserve anonymity of the business associated with the related invoice.

Figure 16:
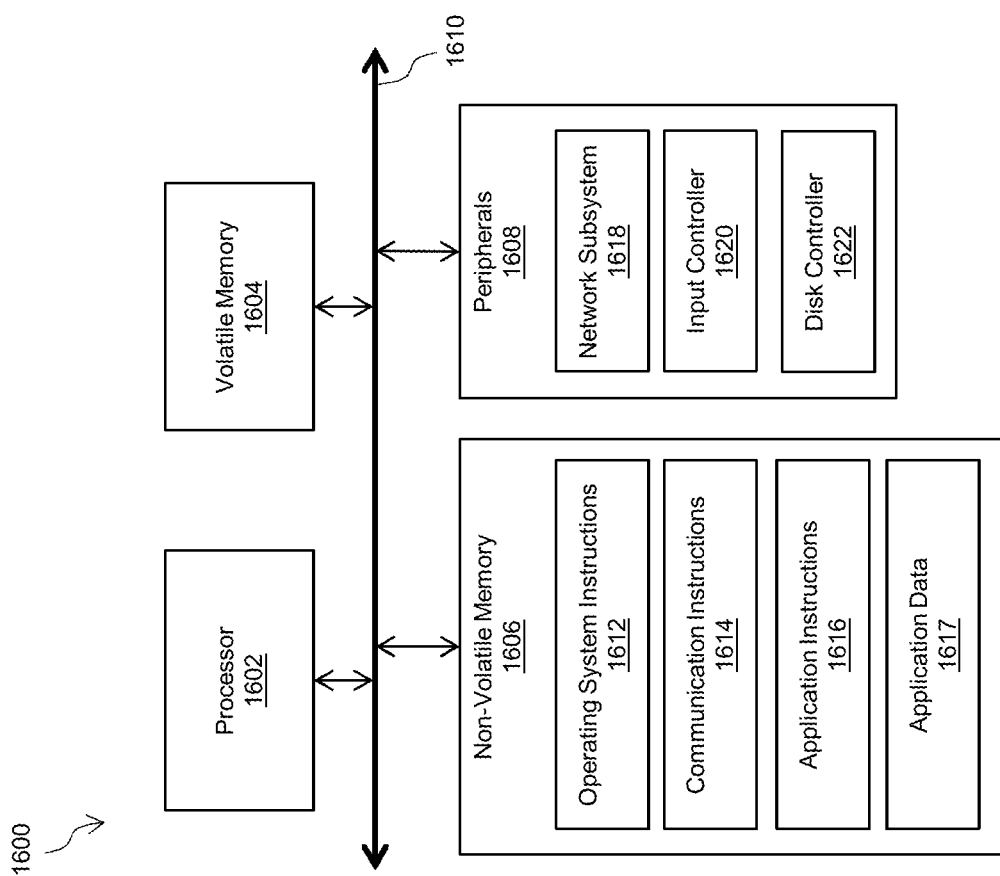
FIG. 16 is an example server device that may be used within the system of FIG. 1, according to an embodiment of the present disclosure.

FIG. 16 is a diagram of an example server device 1600 that may be used within system 100 of FIG. 1. Server device 1600 may implement various features and processes as described herein. Server device 1600 may be implemented on any electronic device that runs software applications derived from complied instructions, including without limitation personal computers, servers, smart phones, media players, electronic tablets, game consoles, email devices, etc. In some implementations, server device 1600 may include one or more processors 1602, volatile memory 1604, non-volatile memory 1606, and one or more peripherals 1608. These components may be interconnected by one or more computer buses 1610.

Processor(s) 1602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 1610 may be any known internal or external bus technology, including but not limited to ISA, EISA, PCI, PCI Express, NuBus, USB, Serial ATA, or FireWire. Volatile memory 1604 may include, for example, SDRAM. Processor 1602 may receive instructions and data from a read-only memory or a random access memory or both. Essential elements of a computer may include a processor for executing instructions and one or more memories for storing instructions and data.

Non-volatile memory 1606 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 1606 may store various computer instructions including operating system instructions 1612, communication instructions 1614, application instructions 1616, and application data 1617. Operating system instructions 1612 may include instructions for implementing an operating system (e.g., Mac OS®, Windows®, or Linux). The operating system may be multi-user, multiprocessing, multitasking, multithreading, real-time, and the like. Communication instructions 1614 may include network communications instructions, for example, software for implementing communication protocols, such as TCP/IP, HTTP, Ethernet, telephony, etc. Application instructions 1616 may include instructions for performing intelligent rolling updates on a cluster of servers according to the systems and methods disclosed herein. For example, application instructions 1616 may include instructions for components 110-112 described above in conjunction with FIG. 1. Application data 1617 may include data corresponding to 108-122 described above in conjunction with FIG. 1.

Peripherals 1608 may be included within server device 1600 or operatively coupled to communicate with server device 1600. Peripherals 1608 may include, for example, network subsystem 1618, input controller 1620, and disk controller 1622. Network subsystem 1618 may include, for example, an Ethernet of WiFi adapter. Input controller 1620 may be any known input device technology, including but not limited to a keyboard (including a virtual keyboard), mouse, track ball, and touch-sensitive pad or display. Disk controller 1622 may include one or more mass storage devices for storing data files; such devices include magnetic disks, such as internal hard disks and removable disks; magneto-optical disks; and optical disks.

Figure 17:
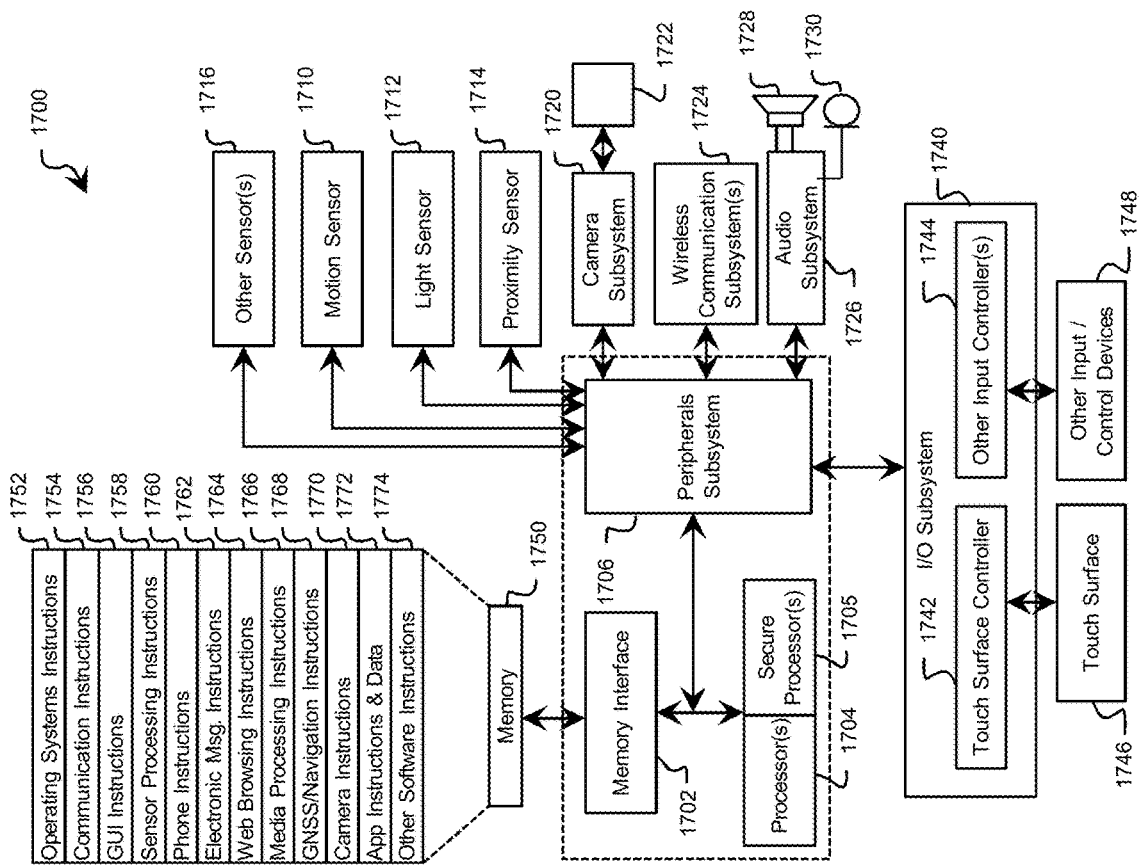
FIG. 17 is an example computing device that may be used within the system of FIG. 1, according to an embodiment of the present disclosure.

FIG. 17 is an example computing device that may be used within the system of FIG. 1, according to an embodiment of the present disclosure. In some embodiments, device 1700 may be user device 102. The illustrative user device 1700 may include a memory interface 1702, one or more data processors, image processors, central processing units 1704, and/or secure processing units 1705, and peripherals subsystem 1706. Memory interface 1702, one or more processors 1704 and/or secure processors 1705, and/or peripherals subsystem 1706 may be separate components or may be integrated in one or more integrated circuits. The various components in user device 1700 may be coupled by one or more communication buses or signal lines.

Sensors, devices, and subsystems may be coupled to peripherals subsystem 1706 to facilitate multiple functionalities. For example, motion sensor 1710, light sensor 1712, and proximity sensor 1714 may be coupled to peripherals subsystem 1706 to facilitate orientation, lighting, and proximity functions. Other sensors 1716 may also be connected to peripherals subsystem 1706, such as a global navigation satellite system (GNSS) (e.g., GPS receiver), a temperature sensor, a biometric sensor, magnetometer, or other sensing device, to facilitate related functionalities.

Camera subsystem 1720 and optical sensor 1722, e.g., a charged coupled device (CCD) or a complementary metal-oxide semiconductor (CMOS) optical sensor, may be utilized to facilitate camera functions, such as recording photographs and video clips. Camera subsystem 1720 and optical sensor 1722 may be used to collect images of a user to be used during authentication of a user, e.g., by performing facial recognition analysis.

Communication functions may be facilitated through one or more wired and/or wireless communication subsystems 1724, which may include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 1724. The specific design and implementation of communication subsystems 1724 may depend on the communication network(s) over which the user device 1700 is intended to operate. For example, user device 1700 may include communication subsystems 1724 designed to operate over a GSM network, a GPRS network, an EDGE network, a WiFi or WiMax network, and a Bluetooth™ network. For example, wireless communication subsystems 1724 may include hosting protocols such that device 1700 may be configured as a base station for other wireless devices and/or to provide a WiFi service.

Audio subsystem 1726 may be coupled to speaker 1728 and microphone 1730 to facilitate voice-enabled functions, such as speaker recognition, voice replication, digital recording, and telephony functions. Audio subsystem 1726 may be configured to facilitate processing voice commands, voice-printing, and voice authentication, for example.

I/O subsystem 1740 may include a touch-surface controller 1742 and/or other input controller(s) 1744. Touch-surface controller 1742 may be coupled to a touch surface 1746. Touch-surface 1746 and touch-surface controller 1742 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 1746.

The other input controller(s) 1744 may be coupled to other input/control devices 1748, such as one or more buttons, rocker switches, thumb-wheel, infrared port, USB port, and/or a pointer device such as a stylus. The one or more buttons (not shown) may include an up/down button for volume control of speaker 1728 and/or microphone 1730.

In some implementations, a pressing of the button for a first duration may disengage a lock of touch-surface 1746; and a pressing of the button for a second duration that is longer than the first duration may turn power to user device 1700 on or off. Pressing the button for a third duration may activate a voice control, or voice command, module that enables the user to speak commands into microphone 1730 to cause the device to execute the spoken command. The user may customize a functionality of one or more of the buttons. Touch-surface 1746 may, for example, also be used to implement virtual or soft buttons and/or a keyboard.

In some implementations, user device 1700 may present recorded audio and/or video files, such as MP3, AAC, and MPEG files. In some implementations, user device 1700 may include the functionality of an MP3 player, such as an iPod™. User device 1700 may, therefore, include a 36-pin connector and/or 8-pin connector that is compatible with the iPod. Other input/output and control devices may also be used.

Memory interface 1702 may be coupled to memory 1750. Memory 1750 may include high-speed random access memory and/or non-volatile memory, such as one or more magnetic disk storage devices, one or more optical storage devices, and/or flash memory (e.g., NAND, NOR). Memory 1750 may store an operating system 1752, such as Darwin, RTXC, LINUX, UNIX, OS X, Windows, or an embedded operating system such as VxWorks.

Operating system 1752 may include instructions for handling basic system services and for performing hardware dependent tasks. In some implementations, operating system 1752 may be a kernel (e.g., UNIX kernel). In some implementations, operating system 1752 may include instructions for performing voice authentication.

Memory 1750 may also store communication instructions 1754 to facilitate communicating with one or more additional devices, one or more computers and/or one or more servers. Memory 1750 may include graphical user interface instructions 1756 to facilitate graphic user interface processing; sensor processing instructions 1758 to facilitate sensor-related processing and functions; phone instructions 1760 to facilitate phone-related processes and functions; electronic messaging instructions 1762 to facilitate electronic messaging-related process and functions; web browsing instructions 1764 to facilitate web browsing-related processes and functions; media processing instructions 1766 to facilitate media processing-related functions and processes; GNSS/Navigation instructions 1768 to facilitate GNSS and navigation-related processes and instructions; and/or camera instructions 1770 to facilitate camera-related processes and functions.

Memory 1750 may store application (or "app") instructions and data 1772, such as instructions for the apps described above in the context of FIGS. 1-15. Memory 1750 may also store other software instructions 1774 for various other software applications in place on device 1700.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for recommending offerings to a business performed by a server, said method comprising:
receiving a request for recommended business offerings from a device;
receiving business data associated with a business from the device, the business data comprising invoice data associated with the business;
embedding the business data to a vector space to obtain a business vector, the vector space comprising a plurality of other vectors associated with other businesses;
calculating a relation metric between the business vector and a vector of the plurality of other vectors, the vector being associated with a second business, the relation metric representing a degree of relation between the business and the second business;
determining that the relation metric is above a pre-defined threshold value; and
responsive to the determining, sending business data associated with the second business to the device, the business data associated with the second business comprising invoice data associated with the second business.

2. The method of claim 1 further comprising:
detecting stop words in the business data associated with the business from a pre-defined list of stop words;
removing the detected stop words from the business data associated with the business;
lemmatizing the business data associated with the business; and
embedding the lemmatized business data to the vector space to obtain the business vector.

3. The method of claim 2 further comprising:
calculating a term frequency-inverse document frequency (TFIDF) value for each word of the lemmatized business data;
ranking the calculated TFIDF values;
identifying a top pre-defined number of words with a highest rank; and
embedding the identified words to obtain the business vector.

4. The method of claim 2 further comprising:
calculating a term frequency-inverse document frequency (TFIDF) value for each word of the lemmatized business data;
identifying a pre-defined number of words with TFIDF values above a certain threshold; and
embedding the identified words to obtain the business vector.

5. The method of claim 1, wherein embedding the business data associated with the business comprises:
applying a word2vec model, the applying comprising:
creating a bag-of-words representing the business data, the bag-of-words including each word in the business data and an associated multiplicity of each word; and
converting each word in the business data into a vector based on the bag of words and not based on grammar and word order.

6. The method of claim 1, wherein calculating the relation metric comprises calculating an inner product between the business vector and the vector of the plurality of other vectors.

7. The method of claim 6 further comprising using a sigmoid function on the inner product to keep the relation metric between zero and one, wherein a one corresponds to a related pair of vectors and a zero corresponds to an unrelated pair of vectors.

8. The method of claim 7, wherein the server comprises a neural network trained on related and non-related pairs of invoices and business descriptions to:

embed related business descriptions to similar regions in the vector space; and embed unrelated business descriptions to different regions in the vector space.

9. The method of claim 8, wherein the neural network is a first neural network, wherein the server comprises a second neural network trained on related and non-related pairs of invoices and business descriptions to:

embed related invoices to similar regions in the vector space; and embed unrelated invoices to different regions in the vector space.

10. A method of training a network to identify related business-invoice pairs performed by a server comprising a first encoder and a second encoder, said method comprising:

embedding, by the first encoder, a plurality of business descriptions to a vector space to obtain a plurality of business vectors, each business description corresponding to an invoice;

embedding, by the second encoder, each corresponding invoice to the vector space to obtain a plurality of invoice vectors;

calculating a relation metric for each description-invoice pair;

training a neural network with the description-invoice pairs and the corresponding relation metrics to predict whether a new invoice and a new business description are related;

training the first encoder to embed related business descriptions to similar regions in the vector space; and training the second encoder to embed related invoices to similar regions in the vector space.

11. The method of claim 10 further comprising training the neural network, the first encoder, and the second encoder jointly in an end-to-end process, the process including:

receiving a plurality of description-invoice pairs and a plurality of relation metrics as labelled training data, each description-invoice pair including an associated relation metric and a label indicating whether the description-invoice pair is related; and applying a back-propagation algorithm to train each of the neural network, first encoder, and second encoder based on the received description-invoice pairs and associated relation metrics.

12. The method of claim 10 further comprising:

detecting stop words in the plurality of business descriptions from a pre-defined list of stop words;

removing the detected stop words from the plurality of business descriptions;

lemmatizing the plurality of business descriptions to obtain lemmatized business descriptions; and embedding, by the first encoder, the lemmatized business descriptions to the vector space to obtain the plurality of business vectors.

13. The method of claim 12 further comprising:

calculating a term frequency-inverse document frequency (TFIDF) value for each word of each lemmatized business description;

ranking the calculated TFIDF values;

identifying a top pre-defined number of words with a highest rank; and embedding, by the first encoder, the identified words to obtain the business vector.

14. The method of claim 12 further comprising:

calculating a term frequency-inverse document frequency (TFIDF) value for each word of each lemmatized business description;

identifying a pre-defined number of words with TFIDF values above a certain threshold; and embedding, by the first encoder, the identified words to obtain the business vector.

15. The method of claim 10, wherein embedding, by the second encoder, each corresponding invoice to the vector space comprises:

embedding each word of each line item of the invoice to create a plurality of word vectors for each line item;

feeding the plurality of word vectors for each line item to a long short-term memory (LSTM) layer;

combining, via the LSTM layer, the plurality of word vectors to obtain a line item vector representing each invoice line item; and combining, using a neural network, the plurality of line item vectors to obtain an invoice vector;

wherein combining includes at least one of vector addition, vector subtraction, scalar multiplication, sigmoid function multiplication, or hyperbolic function multiplication.

16. The method of claim 10, wherein calculating the relation metric comprises calculating an inner product between a business vector and an associated invoice vector.

17. The method of claim 16 further comprising using a sigmoid function on the inner product to keep the relation metric between zero and one, wherein a one corresponds to a related pair of vectors and a zero corresponds to an unrelated pair of vectors.

18. A system for recommending offerings to a business comprising:

a user device;

one or more processors;

a server; and a non-transitory computer-readable medium for recommending offerings to a business comprising instructions stored on the server that, when executed by the one or more processors, cause the server to perform a process operable to:

receive a request for recommended business offerings from the user device;

receive business data associated with a business from the user device, the business data comprising invoice data associated with the business;

embed the business data to a vector space to obtain a business vector, the vector space comprising a plurality of other vectors associated with other businesses;

calculate a relation metric between the business vector and a vector of the plurality of other vectors, the vector being associated with a second business, the relation metric representing a relation between the business and the second business;

analyze the relation metric with a neural network trained to determine whether the business vector and the vector of the plurality of other vectors are related; and responsive to the determining, send business data associated with the second business to the user device, the business data associated with the second business comprising invoice data associated with the second business.

19. The system of claim 18, wherein the server is configured to apply a word2vec model, the applying comprising:

creating a bag-of-words representing the business data associated with the business, the bag-of-words including each word in the business data associated with the business and an associated multiplicity of each word; and converting each word in the business data associated with the business into a vector based on the bag of words and not based on grammar and word order.

20. The system of claim 18, wherein sending business data associated with the second business to the user device comprises:

identifying an invoice associated with the second business;

anonymizing text of the invoice to create anonymized text;

removing stop words from the anonymized text;

lemmatizing the anonymized text to create lemmatized text; and sending the lemmatized and anonymized text to the user device.

\* \* \* \* \*